(12) United States Patent
Moon et al.

(10) Patent No.: US 8,401,248 B1
(45) Date of Patent: Mar. 19, 2013

(54) METHOD AND SYSTEM FOR MEASURING EMOTIONAL AND ATTENTIONAL RESPONSE TO DYNAMIC DIGITAL MEDIA CONTENT

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1092 days.

(21) Appl. No.: 12/317,917

(22) Filed: Dec. 30, 2008

(51) Int. Cl.
*G06K 9/00* (2006.01)

(52) U.S. Cl. .......................... 382/118; 382/103; 382/190

(58) Field of Classification Search .................. 382/103, 382/118, 154, 190
See application file for complete search history.

(56) References Cited

U.S. PATENT DOCUMENTS

| | | | |
|---|---|---|---|
| 5,774,591 A | 6/1998 | Black et al. | |
| 5,797,046 A | 8/1998 | Nagano et al. | |
| 5,818,954 A | 10/1998 | Tomono et al. | |
| 6,072,496 A | 6/2000 | Guenter et al. | |
| 6,154,559 A | 11/2000 | Beardsley | |
| 6,246,779 B1 | 6/2001 | Fukui et al. | |
| 6,879,709 B2 | 4/2005 | Tian et al. | |
| 7,043,056 B2 | 5/2006 | Edwards et al. | |
| 7,046,924 B2 | 5/2006 | Miller et al. | |
| 7,113,916 B1 | 9/2006 | Hill | |
| 7,120,880 B1 | 10/2006 | Dryer et al. | |
| 7,197,165 B2 | 3/2007 | Ryan | |
| 7,233,684 B2 | 6/2007 | Fedorovskaya et al. | |
| 2003/0032890 A1 | 2/2003 | Hazlett et al. | |
| 2003/0123754 A1* | 7/2003 | Toyama | 382/291 |
| 2003/0156304 A1 | 8/2003 | Fedorovskaya et al. | |
| 2005/0073136 A1 | 4/2005 | Larsson et al. | |
| 2006/0206371 A1* | 9/2006 | Hill | 705/10 |
| 2007/0094172 A1 | 4/2007 | Thaler | |
| 2007/0265507 A1 | 11/2007 | de Lemos | |
| 2008/0068397 A1* | 3/2008 | Carey et al. | 345/619 |

OTHER PUBLICATIONS

M. S. Bartlett, et al., "Measuring facial expressions by computer image analysis," Psychophysiology, Mar. 1999; 36(2):253-263.
Y-L. Tian, et al., "Recognizing action units for facial expression analysis," IEEE Transactions on Pattern Analysis and Machine Intelligence, Feb. 2001; 23(2):97-115.

(Continued)

*Primary Examiner* — John Strege

(57) ABSTRACT

The present invention is a method and system to provide an automatic measurement of people's responses to dynamic digital media, based on changes in their facial expressions and attention to specific content. First, the method detects and tracks faces from the audience. It then localizes each of the faces and facial features to extract emotion-sensitive features of the face by applying emotion-sensitive feature filters, to determine the facial muscle actions of the face based on the extracted emotion-sensitive features. The changes in facial muscle actions are then converted to the changes in affective state, called an emotion trajectory. On the other hand, the method also estimates eye gaze based on extracted eye images and three-dimensional facial pose of the face based on localized facial images. The gaze direction of the person, is estimated based on the estimated eye gaze and the three-dimensional facial pose of the person. The gaze target on the media display is then estimated based on the estimated gaze direction and the position of the person. Finally, the response of the person to the dynamic digital media content is determined by analyzing the emotion trajectory in relation to the time and screen positions of the specific digital media sub-content that the person is watching.

32 Claims, 28 Drawing Sheets

OTHER PUBLICATIONS

Y. Zhang, et al., "Active and dynamic information fusion for facial expression understanding from image sequences," IEEE Transactions on Pattern Analysis and Machine Intelligence, May 2005; 27(5):699-714.

M. Yeasin, et al., "Recognition of facial expressions and measurement of levels of interest from video," IEEE Transactions on Multimedia, Jun. 2006, 8(3):500-508.

\* cited by examiner

| EMOTIONAL CATEGORY | PRIMARY VISUAL CUES 957 | | | | | AUXILIARY VISUAL CUES | | | | | TRANSIENT FEATURE(S) |
|---|---|---|---|---|---|---|---|---|---|---|---|
| | AU | AU | AU | AU | AU | AU | AU | AU | AU | AU | |
| HAPPINESS 901 | 6 | 12 | | | | 25 | | 16 | | | WRINKLES ON OUTER EYE CANTHI. PRESENCE OF NASOLIABIAL FURROW |
| SADNESS | 1 | 15 | 17 | | | 4 | | | | | |
| DISGUST | 8 | 10 | | | | 17 | 25 | 26 | | | PRESENCE OF NASOLIABIAL FURROW |
| SURPRISE | 5 | 26 | 27 | 1+2 | | | 7 | 25 | 26 | | FURROWS ON THE FOREHEAD |
| AGNER | 2 | 4 | 7 | 23 | 24 | 17 | 25 | 26 | 16 | | VERTICAL FURROWS BETWEEN BROWS |
| FEAR | 20 | 1+5 | 5+7 | | | 4 | 5 | 7 | 25 | 26 | |

Fig. 12

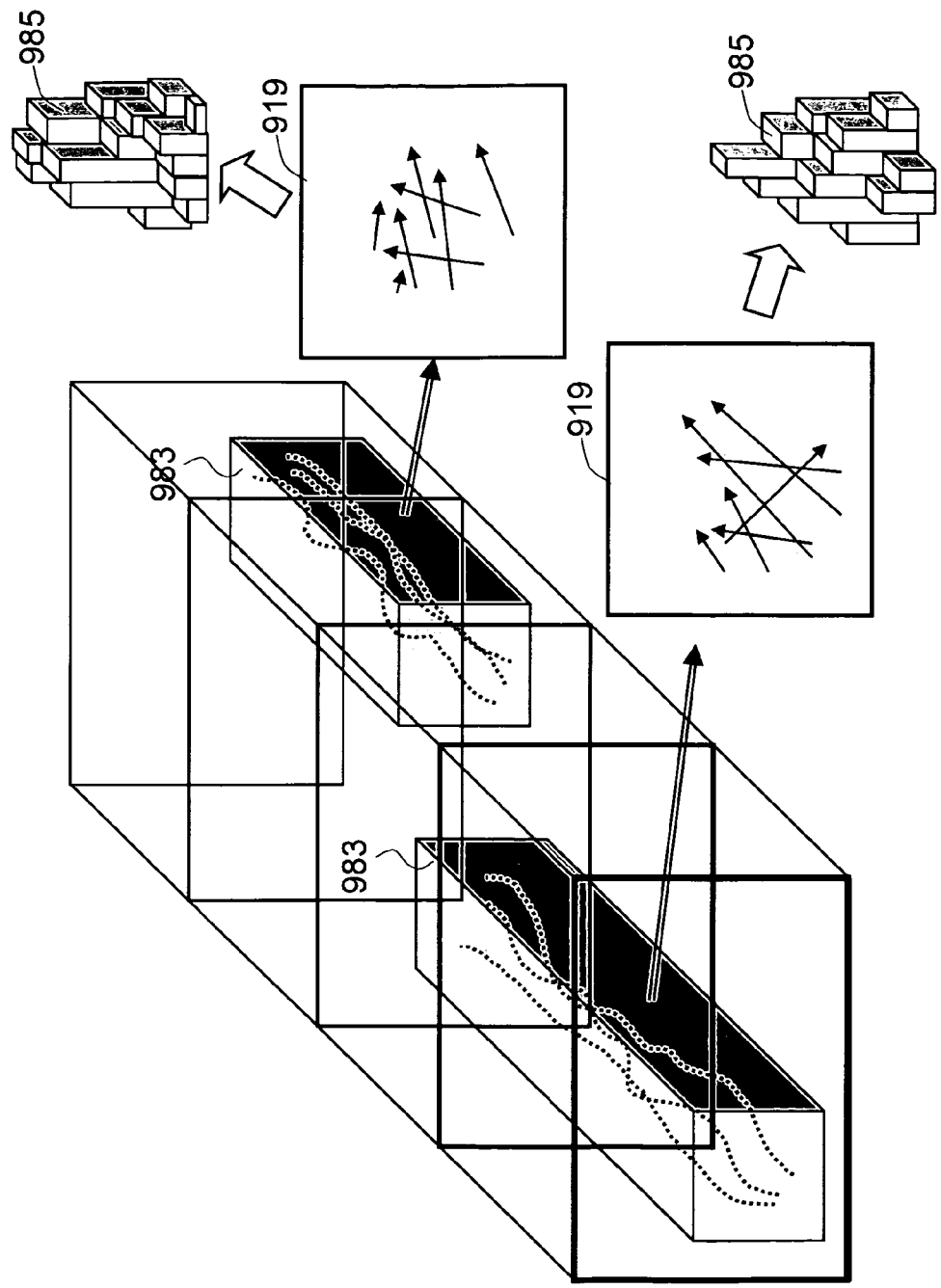

METHOD AND SYSTEM FOR MEASURING EMOTIONAL AND ATTENTIONAL RESPONSE TO DYNAMIC DIGITAL MEDIA CONTENT

BACKGROUND OF THE INVENTION

1. Field of the Invention

The present invention is a method and system to provide an automatic measurement of people's responses to dynamic digital media, based on changes in their facial expressions and attention to specific content.

2. Background of the Invention

Digital media is becoming more widespread and increasingly important in the realm of the commercial advertisement business. Displaying information about products and services through digital media is effective due to it's capability to attract consumers and deliver information through rich audio-visual contents. Digital media also has flexibility in producing the content and ease of delivering the content through automatic programming on a computer network.

As the number of screens displaying digital media increases, the task of assessing the effectiveness of the content toward customer conversion and increased sales revenue is becoming very challenging. It is mainly due to the sheer number of the displays and also to the complexity of the programming content to make individual assessments. Moreover, the true effectiveness of media content lies beneath the human mind—in what way consumers are attracted to the display, whether they react positively or negatively to the advertised material, and how the mental changes affect their perspective about the products and the purchase decisions.

The present invention first provides a method to measure the response of the digital media audience to a given media content. While measuring the changes in the human mind is a very difficult task, apparent changes in people's attention and facial expressions reflect the dynamics of their mental states. We designed an automatic method to estimate the changes in mental state through these visual cues. Video images capturing the media audience will be the input to the system, and the system will employ computer vision algorithms to process the facial images of the people in the audience to recognize their changes in attention and facial expressions.

On the other hand, the complexity of digital media content also poses challenges to the task of media measurement. Digital media is not static advertisements, such as product banners or signs; it continuously changes its content—visual scenes, texts, or animations within its programming. The changes in content are designed to deliver information about products in an effective manner. Therefore, measuring the overall response to the media programming would be only a subset of the task; measuring the effectiveness of the sub-content that appears within the spatial and temporal extent of the program will provide further insight into the media measurement, so that the digital media production can focus on individual elements to improve the overall effectiveness.

To meet this goal, the present invention measures the changes in the mental states of the media audience for individual content presented both in spatial and temporal extent of the content material. More specifically, it estimates at which screen position each person in the audience is watching, and recognizes the emotional changes of the person toward that specific sub-content. For example, a person may stay neutral through the video content of the programming until a certain scene appears that appeals to him in a positive way. In another scenario, a person may like the overall product descriptions but can become negative when other information is revealed in the form of text at a certain portion of the screen.

Recent developments in computer vision and artificial intelligence technology make it possible to recognize the human response to digital media display based on images. Facial image analysis has especially matured, so that faces can be detected and tracked from video images, and the motion of the facial features can also be estimated. The facial appearance changes due to facial expressions can be measured to estimate the internal emotional state of a person. The proposed invention aims to solve the problem under realistic scenarios, where people show their natural reaction toward digital media display. While it is not entirely possible to estimate the mental state of a person based solely on apparent changes, the changes in the person's facial expression often carry highly relevant information about the person's response. The facial expression is recognized to be translated into six emotion categories: Happiness, Sadness, Surprise, Anger, Disgust, and Fear. These categories are known to reflect the more fundamental affective states of the human mind: Arousal, Valence, and Stance. This invention assumes that these affective states, if estimated, provide information more directly relevant (than do the six emotion categories) to the recognition of people's responses toward certain visual elements. For example, the degree of valence directly reveals the positive or negative attitude. The changes in emotional state will then render a trajectory in the three-dimensional affect space. Under the context of temporally changing media content, the emotion trajectory represents the changes in the mental state of a person in relation to the displayed content.

It is also possible to measure the information as to at which screen position a person is watching—the gaze of the person. The measurement of gaze is one way to measure the person's interest and attention; the person's gaze reveals which material showing on the screen is capturing his/her attention at the moment. The gaze target—the location within the screen where the person's gaze is fixated—is estimated by measuring the eye gaze of the person as well as the facial pose of the person; the eye gaze of a person is defined as the orientation of the person's gaze relative to the person's face. An automated analysis of the person's image captured from at least one camera provides the measurement for estimating the gaze target. The cameras are placed and oriented so that they can capture the faces of potential viewers of the media display; the cameras are typically placed near the display. The estimated positions of the irises relative to the eyes, along with the estimated head orientation, reveal the shopper's gaze direction. However, because of the nonlinear way that different facial poses affect the appearance changes in the eye image due to the eye gaze, a machine learning-based method is introduced to find the facial pose-dependent gaze direction estimation. The final gaze target is estimated based on the estimated gaze direction and the person position (more specifically, the head position). The media screen is divided into target grids, so that the gaze target estimation can identify at which target grid a person is currently watching. The resolution of the gaze target estimation is determined by the number of target grids on the screen; the target grids are determined from the accuracy of the gaze target estimation.

Once the emotional state and the gaze target are determined, these two kinds of measurements are used to associate the emotional response to a specific content that the person is consuming. It is another crucial feature of the present invention to derive such information from these two modalities. The changes in emotional state are estimated in the form of temporal emotion trajectories in affect space. The estimate of visual attention will have the form of temporal changes of the gaze target in terms of (X, Y) coordinates on the screen. The combination—emotional changes localized to screen positions—will be called the "spatiotemporal emotional response map." At each point (X, Y, t) in the spatiotemporal domain, the collections of three-dimensional coordinates (in the affect space) of emotional responses of people watching the content displayed at (X, Y) will be recorded. The spatial resolution of the target grid on the screen can range from a resolution as rough as "upper left to upper right" or "lower left to lower right," up to a much higher resolution, depending on the accuracy of the gaze target estimation algorithm under the given environment. The collected spatiotemporal emotional response map can be further analyzed to derive useful rating data corresponding to the specific media content.

There have been prior attempts for automatically recognizing the facial expression of a person from video images.

In U.S. Pat. No. 5,774,591 of Black, et al. (hereinafter Black), the motions of the facial features due to expression are estimated by computing an explicit parametric model of optical flow. The facial feature motions are translated into mid-level predicates, which in turn are used to determine the expression categories. The proposed invention utilizes emotion-sensitive features that extract feature shape changes implicitly, just to be fed to a learning machine to estimate the facial muscle action. In U.S. Pat. No. 6,072,496 of Guenter, et al. (hereinafter Guenter), the facial actions are estimated in terms of very involved three-dimensional mesh model by tracking a set of dedicated marker points. The present invention strives to estimate the shape change of the facial features just enough to determine the facial muscle actions, without using any artificial markers. U.S. Pat. No. 6,879,709 of Tian, et al. (hereinafter Tian-1) only aims to detect emotionless faces, while the present invention tries to estimate the change of expressions in a space representing the whole range of human emotions. In U.S. Pat. Appl. Pub. No. 2007/0265507 of de Lemos (hereinafter de Lemos), mostly eye tracking estimates are used to assess the degree of attention and the target of attention within the visual stimulus. The present invention shares a similar goal of estimating human response in relation to a given visual target, but introduces a different focus on the measurement of whole facial feature shapes to determine the emotional changes, with specific technical methods to estimate the facial actions, emotional changes, and finally the response. The response to the changing media content is also analyzed based on the emotion trajectory in relation to the time and screen positions of the specific media sub-content. "Measuring facial expressions by computer image analysis," Psychophysiology, Vol. 36, Issue 2, by Bartlett, et al. (hereinafter Bartlett) aims to estimate upper facial Action Units utilizing the holistic, feature-based, and motion (flow)-based image representation and a neural network-based learning of the representation. "Recognizing Action Units for Facial Expression Analysis," IEEE Transactions on Pattern Analysis and Machine Intelligence, Vol. 23, No. 2, by Tian, et al. (hereinafter Tian-2) also estimates parametric models of facial feature shapes, and employs neural networks to learn the mapping to the facial Action Units. The present invention also estimates the facial Action Units in an exemplary embodiment of facial muscle actions, and utilizes a learning machine to find a mapping from the image representation to the muscle actions. However, the present invention utilizes an emotion-sensitive feature extraction scheme, which is different from Bartlett or Tian-2. The present invention also utilizes a novel scheme to localize a face and its facial features, while in Bartlett the faces are assumed to be aligned. In "Active and dynamic information fusion for facial expression understanding from image sequences," IEEE Transactions on Pattern Analysis and Machine Intelligence, Vol. 27, Issue 5, by Zhang, et al. (hereinafter Zhang), the dynamic change of facial expressions is recognized by a series of methods starting from IR-based eye detection, and facial feature detection based on the eye detection. The facial Action Units recognition is based on deterministic correspondence. The present invention employs a novel combination of the face detection, localization, and facial feature localization. The mapping from the facial features shapes to the facial muscle actions is learned by training on a large number of samples.

There have been prior attempts for automatically measuring the audience response to displayed objects or media.

U.S. Pat. No. 7,113,916 of Hill (hereinafter Hill) aims to measure consumer reaction to marketing stimulus, whose goal is shared by the present invention. However, Hill lists interviewing and manual video coding as tools for collecting opinions and facial expressions. U.S. Pat. No. 7,120,880 of Dryer, et al. (hereinafter Dryer) proposes a system utilizing a host of measurement modalities, such as facial expression, head gesture, or speech, to assess the level of interest to media content. U.S. Pat. No. 7,233,684 of Fedorovskaya, et al. (hereinafter Fedorovskaya-1) and U.S. Pat. Appl. Pub. No. 2003/0156304 of Fedorovskaya, et al. (hereinafter Fedorovskaya-2) propose systems measuring affective information based on the visual image or physiological signal of a person and associating the affective information with the image and person, respectively. Hill, Dryer, Fedorovskaya-1, and Fedorovskaya-2 all propose overall systems, without introducing a very specific novel technical means to achieve the recognition of the response or affective information. The present invention introduces novel technology to automatically extract relevant information from the raw image data and recognize the emotional changes as well as the target of attention. U.S. Pat. Appl. Pub. No. 2003/0032890 of Hazlett, et al. (hereinafter Hazlett) proposes an emotional response measurement based on electromyographic signal of facial muscles, while the present invention processes common visual signal to make the same kind of measurement. U.S. Pat. Appl. Pub. No. 2007/0094172 of Thaler (hereinafter Thaler) presents a rating system utilizing neural networks, without specific reference to how the input data to the neural network is generated. The present invention also uses learning machines such as neural networks, but the learning machines are trained to process feature vectors that are extracted from video images following novel and specific procedures.

There have been prior attempts for automatically estimating the gaze direction of a human observer.

In U.S. Pat. No. 5,797,046 of Nagano, et al. (hereinafter Nagano), the gaze direction is estimated based on the optical signal of the light reflected by the iris, and on the stored personal signature of the reflection. In U.S. Pat. No. 5,818,954 of Tomono, et al. (hereinafter Tomono), the measured position of the iris relative to the measured facial coordinate is used to estimate the gaze. In U.S. Pat. No. 6,154,559 of Beardsley (hereinafter Beardsley), the gaze target is recognized based on the measurement of the head pose and the correlation between a known visual target and the head pose, using the head pose histogram of frequent gaze targets. In U.S. Pat. No. 6,246,779 of Fukui, et al. (hereinafter Fukui), the gaze is estimated by comparing the measured facial image feature pattern against the stored facial image feature patterns, using neural networks. In U.S. Pat. No. 7,043,056 of Edwards, et al. (hereinafter Edwards), the eye gaze direction is estimated by first determining the head pose angle and then by locating the iris position relative to the eye region based on a precise geometric model of eyes. In U.S. Pat. No. 7,046,924 of Miller, et al. (hereinafter Miller), the eye gaze direction and its path are estimated to identify an area of importance in images. In U.S. Pat. No. 7,197,165 of Ryan (hereinafter Ryan), a three-dimensional head model is utilized to estimate the head pose and gaze. The present invention employs basic ideas for its visual target estimation similar to the mentioned inventions; first estimate the head pose, and locate the eye and iris positions. The position of the irises relative to the localized eyes provides the data to estimate the gaze direction. However, we adopt a series of machine learning-based approaches to accurately and robustly estimate the gaze under realistic imaging conditions; a two-dimensional facial pose estimation followed by a three-dimensional facial pose estimation, where both estimations utilize multiple learning machines. The facial features are also accurately localized based on the estimated global facial geometry, again using combinations of multiple learning machines, and each take part in localizing a specific facial feature. Each of these machine learning-based estimations of poses or locations utilizes a set of filters specifically designed to extract image features that are relevant to a given estimation problem. Finally, the eye gaze estimates are interpreted differently with varying head pose estimates, to estimate the gaze direction and gaze target. Unlike most of the prior inventions, which focus on close-range visual targets, the present invention aims to estimate gaze regardless of distance, using a series of robust methods for face detection, pose estimation, and eye gaze estimation. To deal with the problem of gaze target estimation from a distance, the position of the head (the starting point of the gaze) is robustly estimated.

In summary, the present invention provides fully automatic face localization and facial feature localization approaches, for accurately extracting facial and transient features to estimate facial muscle actions due to emotional changes. It is a key novel feature of the present invention to train a learning machine based on the extracted emotion-sensitive features to estimate the facial muscle action; the emotion-sensitive features are designed to extract image features that are highly correlated with the facial expressions. The present invention shares the goal of estimating human response in relation to a given visual element similar to other rating approaches, but it adopts a unique method to analyze the final response based on the continuous emotion trajectory in the context of the given dynamic media programming.

The present invention also provides robust facial pose estimation and eye gaze estimation approaches to determine at which screen position a person is looking; it adopts a series of machine learning-based approaches to accurately and robustly estimate the gaze target under realistic imaging conditions, without using specialized imaging devices and without requiring close-range images or prior three-dimensional face models. The eye gaze is processed in the context of varying facial pose, so that the appearance changes of the eyes due to pose changes can be properly handled.

It is one of the novel features of the present invention to collect the emotional response of a person to a specific media content that the person is looking at, based on the association between the measured emotional response and the estimated gaze target. The method makes it possible for the temporal changes of emotion to be analyzed in the context of spatiotemporal media content.

SUMMARY

The present invention is a method and system to provide an automatic measurement of people's responses to dynamic digital media, based on changes in their facial expressions and attentions to specific contents.

It is one of the objectives of the first step of the processing to detect, track, and localize faces in an image sequence, and localize facial features. A detected and tracked face in a given image frame has a bounding box around the face that approximately delimits its position and size. The image inside the bounding box is cropped, rescaled to a standard size (for example, 30×30), and fed to the face localization machines. The face localization machines estimate the geometry in cooperation, and the facial image is localized based on these estimates. The facial feature images are cropped from the localized facial image, according to the placements of the standard feature windows. The facial feature localization machines estimate the position, size, and orientation variations of the facial features inside the standard feature windows.

It is one of the objectives of the second step of the processing to extract emotion-sensitive features, and to recognize the facial muscle actions based on these features. First, the step derives a set of filters that are matched to facial feature shapes or transient feature (facial wrinkles) shapes, so that the filters can extract the features relevant to facial expressions. Then each filter in the emotion-sensitive feature filters is applied to a correspondingly aligned feature in the image to compute the response. All of the responses are collected into the emotion-sensitive feature vector. After these features have been extracted, it is not straightforward to make a direct connection between the emotion-sensitive filter responses and the facial expressions due to the complex relation between the image responses and the expressions; a large number of such emotion-sensitive feature vectors along with the ground truth expression categories are utilized to learn the relation in a machine learning framework. The trained facial muscle actions recognition machine accepts the emotion-sensitive feature vector as an input and computes the likelihoods of the input face showing the corresponding muscle actions.

It is one of the objectives of the third step of the processing to estimate the emotion trajectory in affect space that represents the changes in emotion. The computed facial muscle actions are mapped to the six emotion categories using deterministic relations between the facial muscle actions and the six emotion categories. Then, based on the affect space coordinates of the six emotion categories, the facial muscle actions are mapped into affect space. The temporal sequence of facial muscle actions due to emotional changes generates an emotion trajectory in affect space.

It is one of the objectives of the fourth step of the processing to estimate the gaze direction of the face by estimating the three-dimensional pose of the localized face and the eye gaze of the localized eyes. The three-dimensional facial pose estimation computes the yaw (horizontal rotation) and pitch (vertical rotation) angles of the face based on the estimated facial feature positions. The eye gaze can be estimated based on the shape and the appearance of the localized eye image and iris image. The estimated three-dimensional pose and the eye gaze are combined to estimate the gaze direction; the step computes the gaze direction by finding a three-dimensional facial pose-dependent mapping from the three-dimensional facial pose and the eye gaze to the gaze direction.

It is one of the objectives of the fifth step of the processing to estimate the gaze target of the person based on the estimated gaze direction and person position. From the gaze target estimates of the person over time, a gaze trajectory can be constructed.

It is one of the objectives of the sixth step of the processing to construct a spatiotemporal emotional response map based on the estimated emotion trajectories and the estimated gaze targets. The emotion trajectories are first segmented according to the gaze targets and spatiotemporal media content map so that each segment of an emotion trajectory corresponds to a specific spatiotemporal media content. Then the segmented emotion trajectories belonging to spatiotemporal media content are combined together as a single statistic that represents the rating of the spatiotemporal media content.

DRAWINGS

Figures

FIG. 12 shows a table that lists the association between the set of FACS Action Units and the set of six emotion categories, in an exemplary embodiment of the present invention.

FIG. 28 shows an exemplary spatiotemporal emotional response histogram construction scheme.

DETAILED DESCRIPTION OF THE INVENTION

Figure 1:
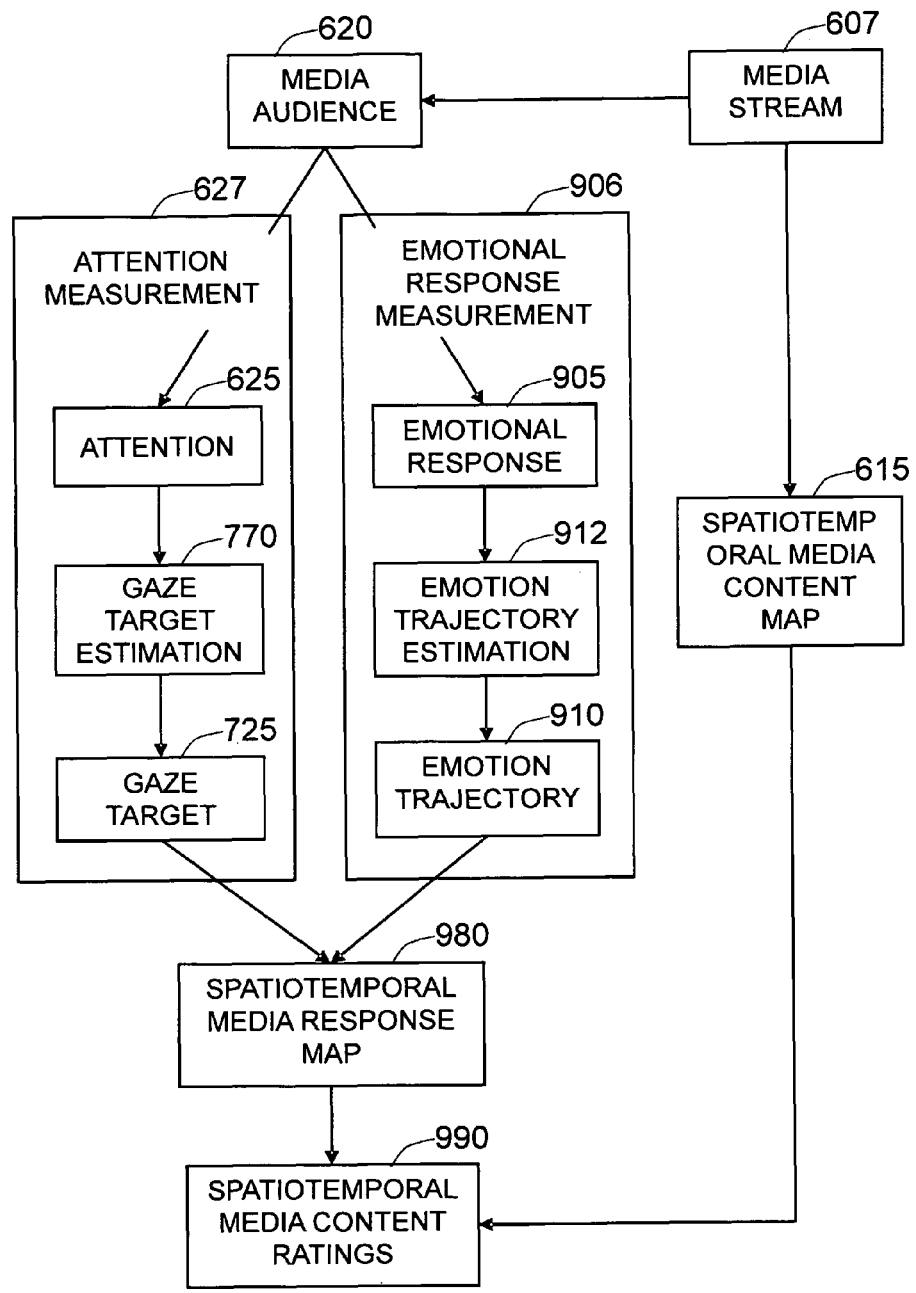
FIG. 1 is an overall scheme of the system in a preferred embodiment of the invention.

FIG. 1 is an overall scheme of the system in a preferred embodiment of the invention. The media stream 607 is exposed to a media audience 620, so that each person in the audience demonstrates both attention 625 and emotional response 905 to the media content. The attention is measured 627 through the process of gaze estimation in the form of gaze target 725; more specifically, it is estimated through the gaze target estimation 770 step. The emotional response is measured 906 through facial expression of the person in the form of emotion trajectory 910 through the emotion trajectory estimation 912 step, within an overall process of emotion recognition 907. The emotion trajectory 910 and the gaze target 725 are coupled in a way that reveals the emotional response of the person to content in a specific screen position and time; the collection of the emotional responses is called a spatiotemporal media response map 980. The spatiotemporal media response map 980 is analyzed in the context of the spatiotemporal media content map 615 of the media stream 607, to finally generate the spatiotemporal media content ratings 990. The spatiotemporal media content map 615 is the schedule of when (in the duration of the programming) and where (in the screen) each media content (such as a person, a significant scene, or a text) appears and disappears. The final spatiotemporal media content ratings 990 reveal the collective responses of the media audience to the individual media content in the media stream 607. The present invention is a method and apparatus for providing an automatic measurement of people's responses to digital media, based on changes in their facial expressions and attentions to specific contents.

Figure 2:
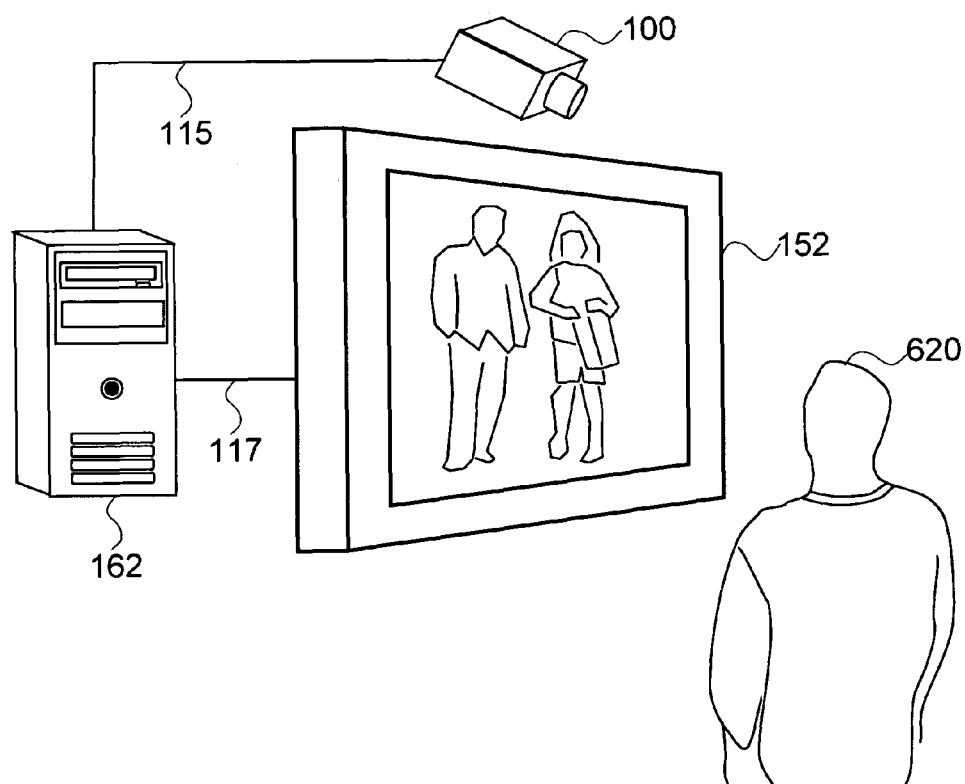
FIG. 2 shows a view of the system of the invention in an operational environment in an exemplary embodiment.

FIG. 2 shows a view of the system of the invention in an operational environment in an exemplary embodiment. The means for capturing images 100 is placed near a media display 152, so that it can capture the faces of the media audience 620 watching the display. The displayed media content is controlled by the control and processing system 162. The video feed from the means for capturing images 100 is transferred to the control and processing system 162 via means for video interface 115, and the spatiotemporal media content map of the displayed media programming is also provided to the control and processing system 162 via a means for data transfer 117, so that the control and processing system 162 can process both sources of information to interpret the response of the media audience 620 in relation to the media content.

Figure 3:
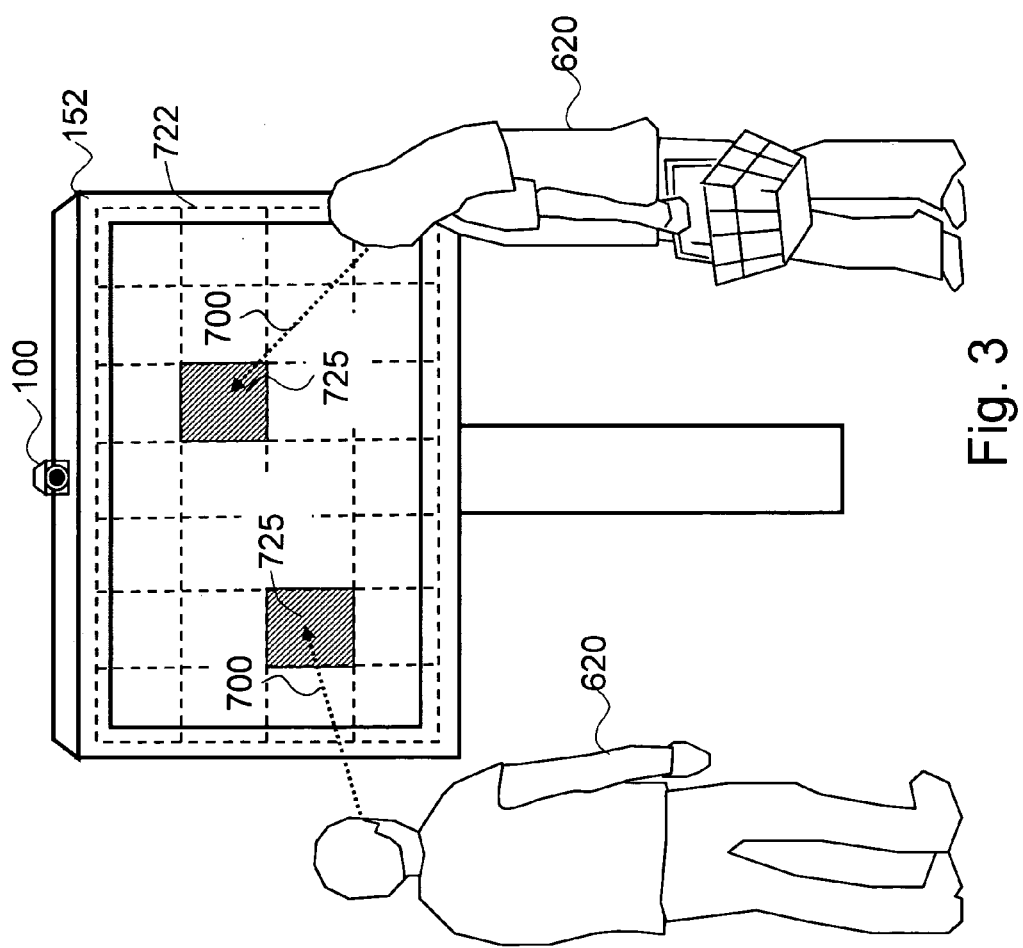
FIG. 3 shows a media display and a media screen grid in an exemplary embodiment of the present invention.

FIG. 3 shows a media display 152 and each estimated gaze target 725 of the media audience 620 in the media screen grid 722 in an exemplary embodiment of the present invention. In this embodiment, each square block in the media screen grid 722 represents a position in the media display 152 that can differentiate media content appearing at different positions of the screen. The media screen grid 722 is not a physical entity; it is merely a set of spaced horizontal and vertical lines where the width of the spacing is determined by the accuracy of the gaze target estimation algorithm. Based on the analysis of the images from the means for capturing images 100, the gaze direction 701 of each media audience 620 is estimated and is shown as a dotted arrow, and the gaze target 725 is estimated and shown as a shaded grid square.

Figure 4:
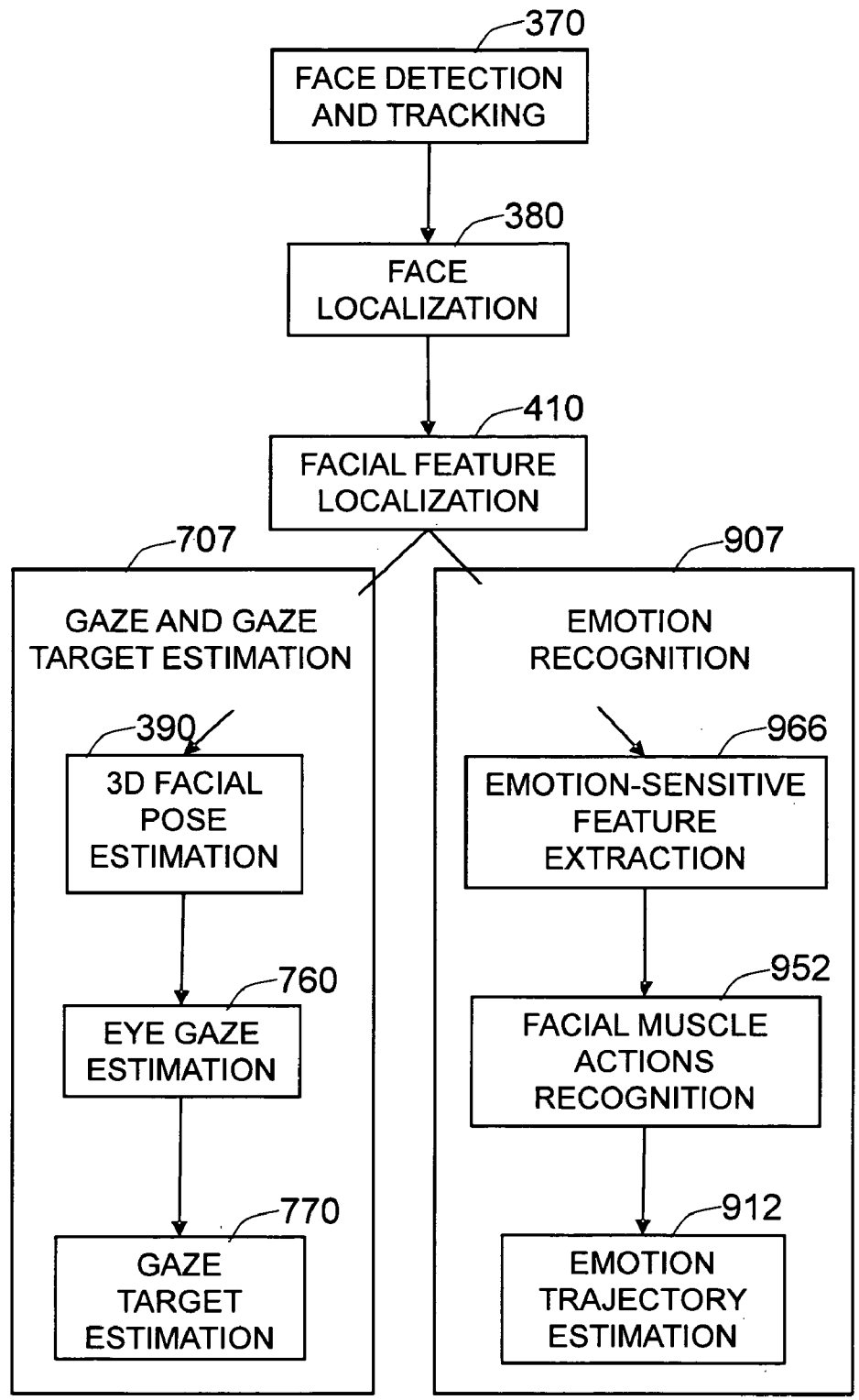
FIG. 4 shows the facial image processing steps necessary for the gaze and gaze target estimation and the emotion trajectory estimation.

FIG. 4 shows the facial image processing steps necessary for the gaze and gaze target estimation 707 and the emotion recognition 907. The face detection and tracking 370 steps locate faces from the audience and individually track them. The face localization 380 step adjusts the position, size, and orientation of each detected face within the face detection window 366. The facial feature localization 410 step then accurately identifies and localizes each facial feature from the facial image approximately localized from the previous step. The out-of-plane rotation of the face is estimated in the three-dimensional facial pose estimation 390 step, based on the estimated facial feature locations relative to the face. The estimated three-dimensional facial pose along with the localized eye images are used in the eye gaze estimation 760 step, so that the gaze target 725 of the person can be estimated in the gaze target estimation 770 step. The aligned facial image together with the identified and localized facial features are fed to the emotion-sensitive feature extraction 966 step, so that the image features relevant to the estimation of facial expressions are derived. The extracted features are used to compute the facial muscle actions 951 in the facial muscle actions recognition 952 step. The changes in the facial muscle actions 951 estimated through the facial image sequence render the emotion trajectory 910 in the emotion trajectory estimation 912 step.

Figure 5:
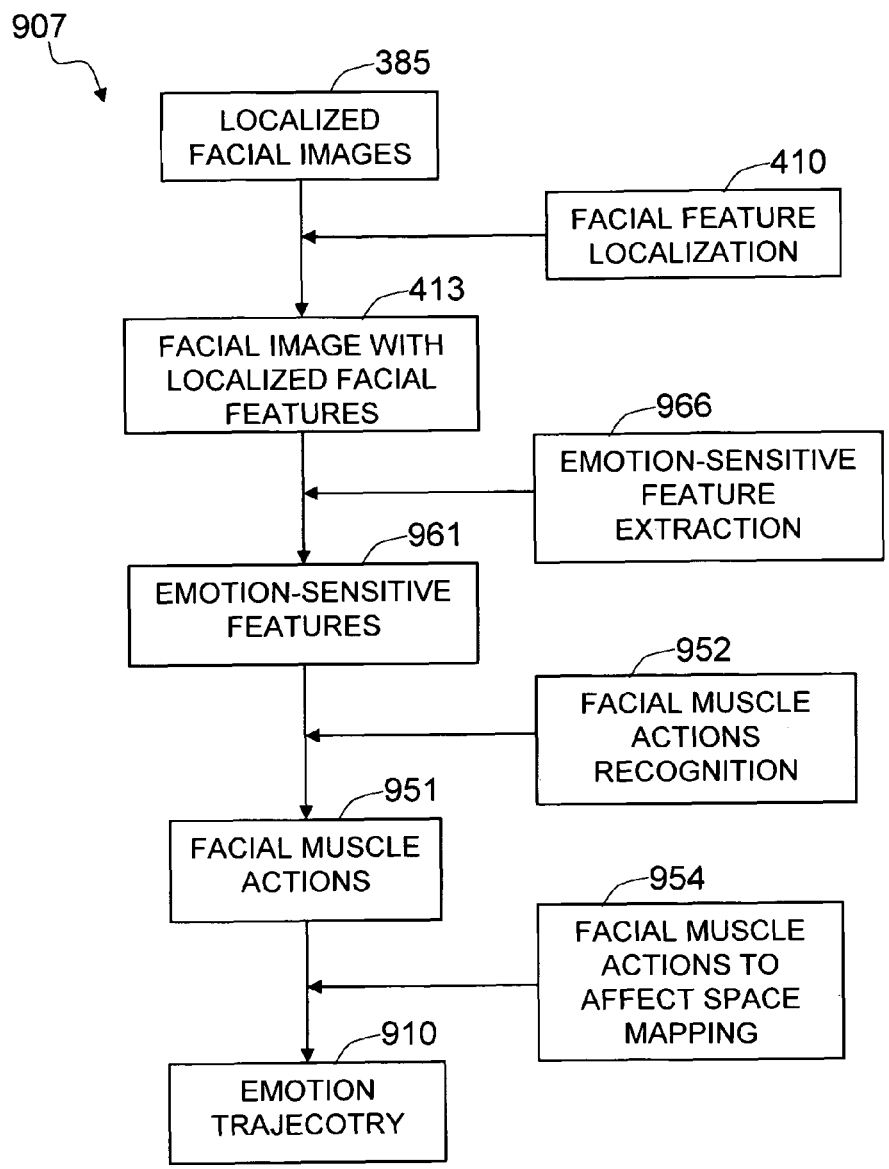
FIG. 5 shows an exemplary procedure for the emotion recognition step.

FIG. 5 shows an exemplary procedure for the emotion recognition 907 step. The face localization 380 step generates localized facial images 385. The facial feature localization 410 step then identifies facial features and estimates their accurate locations and sizes 413. The emotion-sensitive feature extraction 966 step then applies a set of emotion-sensitive feature filters 963 to derive emotion-sensitive features 961. The facial muscle actions recognition 952 step recognizes one or more facial muscle actions 951 out of 32 predefined set of actions that represents distinct facial muscle movements due to facial expressions. The recognized set of facial muscle actions are translated into an emotional state in affect space based on the facial muscle actions to affect space mapping 954. A series of such procedure applied to an image sequence produces emotion trajectory 910 in affect space 922.

Figure 6:
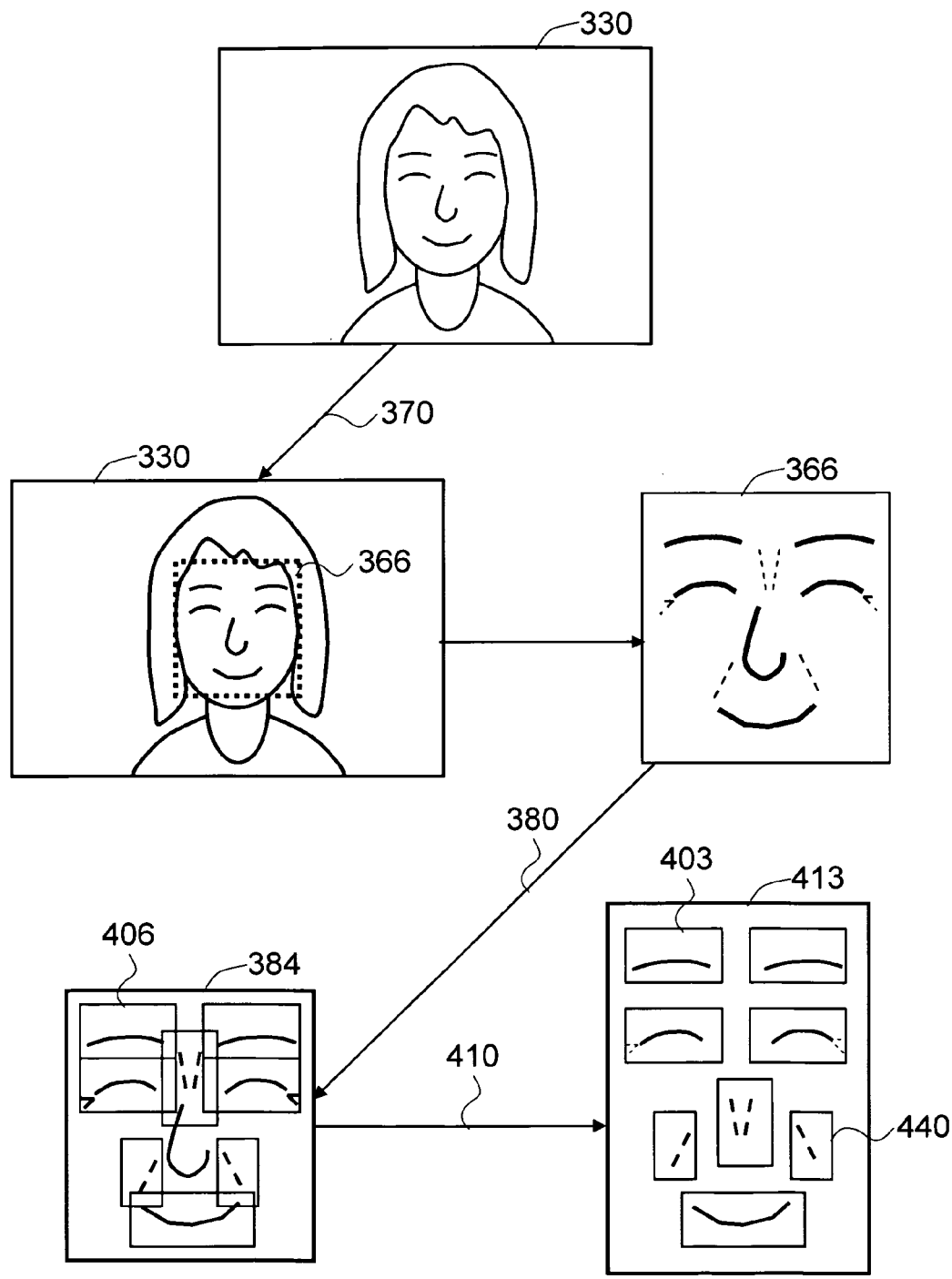
FIG. 6 shows a series of facial image processing, from face detection and tracking to face localization, and to facial feature localization.

FIG. 6 shows a series of facial image processing, from face detection and tracking 370 to face localization 380, and to facial feature localization 410. Any image-based face detection algorithm can be used to detect human faces from an input image frame 330. Typically, a machine learning-based face detection algorithm is employed. The face detection algorithm produces a face detection window 366 that corresponds to the location and the size of the detected face. The face localization 380 step estimates the two-dimensional and three-dimensional poses of the face to normalize the face to a localized facial image 384, where each facial feature is localized within the corresponding standard facial feature window 406. The facial feature localization 410 then finds the accurate locations of each facial feature or transient feature to extract them in a facial feature window 403 or a transient feature window 440.

Figure 7:
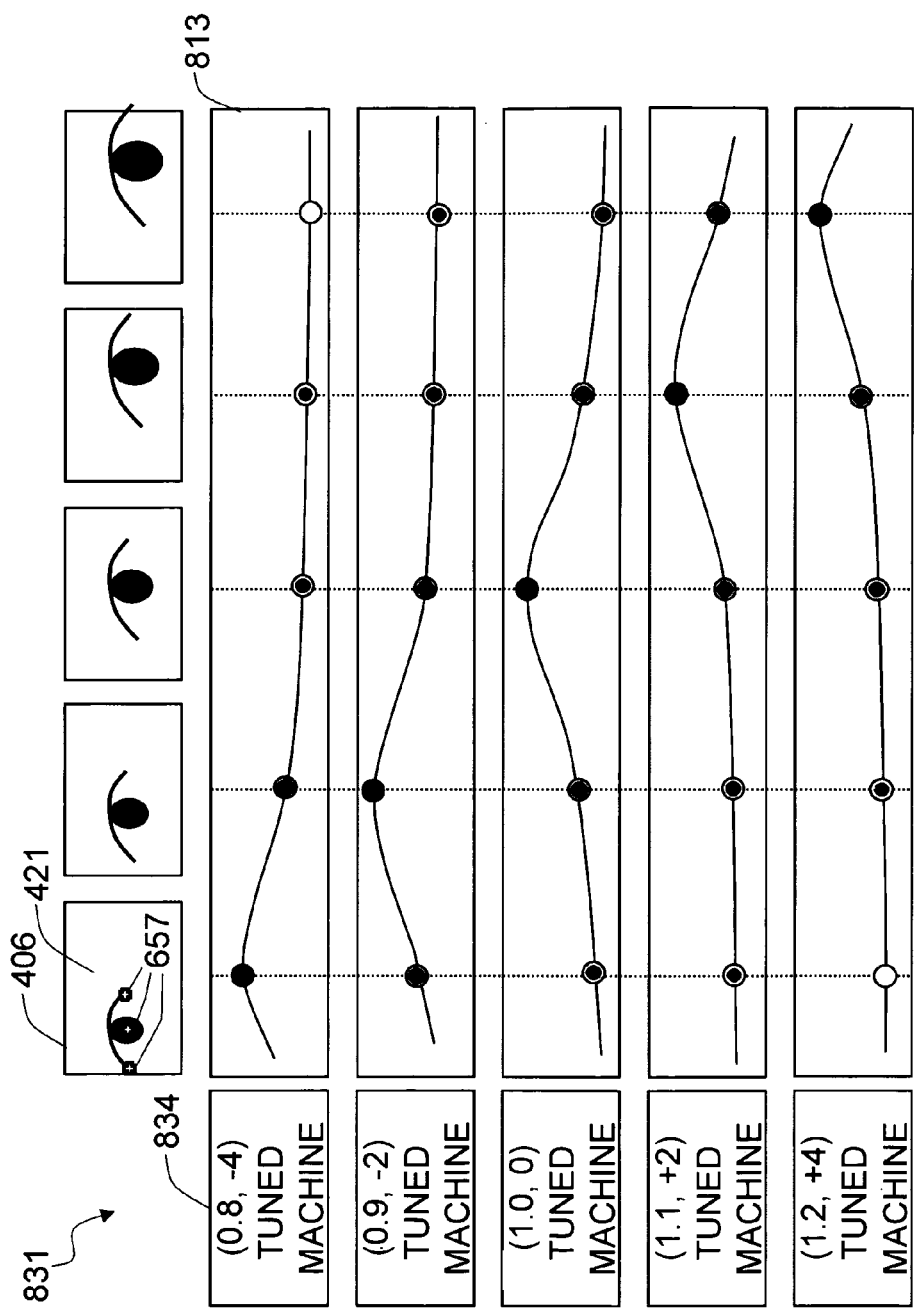
FIG. 7 shows a facial feature localization training scheme in an exemplary embodiment of the present invention.

FIG. 7 shows a facial feature localization training scheme 831 necessary for the facial feature localization 410 step. The face localization training 820 for face localization 380 can be performed on facial images 631, instead of facial feature images 643, in a similar manner.

This exemplary training scheme aims to estimate the x (horizontal) shift, y (vertical) shift, the scale, and the orientation of the right eye within the standard facial feature window 406.

The training eye images are generated by cropping the standard facial feature window 406 of the right eye from the localized face. The facial landmark points of the face are assumed to be known, and the coordinates of the landmark points 657 after going through the face localization 380 step are available.

Given an input right eye image 421, the machine having the inherent geometry of (x0, y0, s0, o0) is trained to output the likelihood of the eye image 421 having the inherent geometry. If the input training eye has the (ex, ey, es, eo), then the target output is the Gaussian likelihood: L=Exp(−(ex−x0)/kx−(ey−y0)/ky−(es−s0)/ks—(eo−o0)/ko). kx, ky, ks, and ko are constants determined empirically. (ex, ey, es, eo) can be easily determined beforehand using the coordinates of the landmark points relative to the standard facial feature positions and sizes.

Each plot in the figure illustrates the responses 813 profile that each machine is trained to learn. Each machine is trained to produce a peak for the eye image 421 having the matching geometry, and to produce gradually lower values as the geometry changes from the inherent geometry of the machine. In this exemplary embodiment, multiple learning machines are employed to estimate the x-location and the scale of the right eye, where each machine is tuned to a specific (x-shift, scale) pair; the figure is illustrated only for the two dimensions (x, s)=(x-shift, scale) for the purpose of clear presentation.

Figure 8:
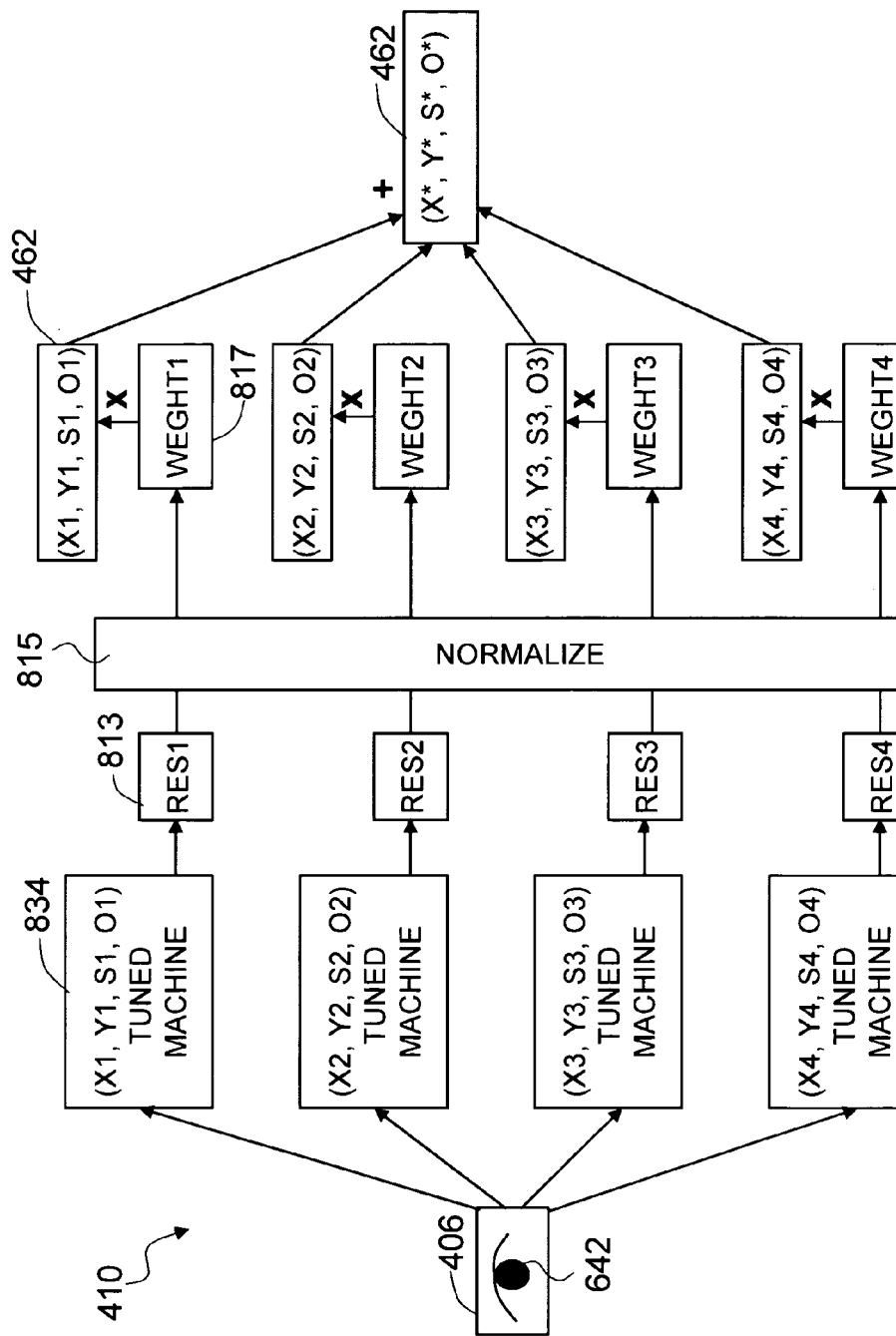
FIG. 8 shows the facial feature localization scheme in an exemplary embodiment of the present invention.

FIG. 8 shows the facial feature localization 410 scheme in an exemplary embodiment of the present invention. The face localization 380 can be performed on a facial image 630, instead of a facial feature image 642, in a similar manner.

Once each facial feature-tuned machine 834 has been trained to output the likelihood of the given facial feature to have the predetermined pose vector (xi, yi, si, oi), an array of such learning machines can process any facial feature image 642 to compute the likelihoods.

A given facial feature image 642 inside the standard facial feature window 406 is fed to the trained learning machines, and then each machine outputs the responses 813 to the particular pose vector 462 (xi, yi, si, oi). The responses are then normalized 815 by dividing them by the sum of the responses to generate the weights 817. The weight is then multiplied to the corresponding pose vector (xi, yi, si, oi). The pose vectors (x1, y1, s1, o1), (xN,yN,sN,oN) are weighted and added up to compute the estimated pose vector (x*, y*, s*, o*). The pose vector represents the difference in position, scale, and orientation that the given facial feature image has against the standard feature positions and sizes. The pose vector is used to correctly extract the facial features and the transient features.

Figure 9:
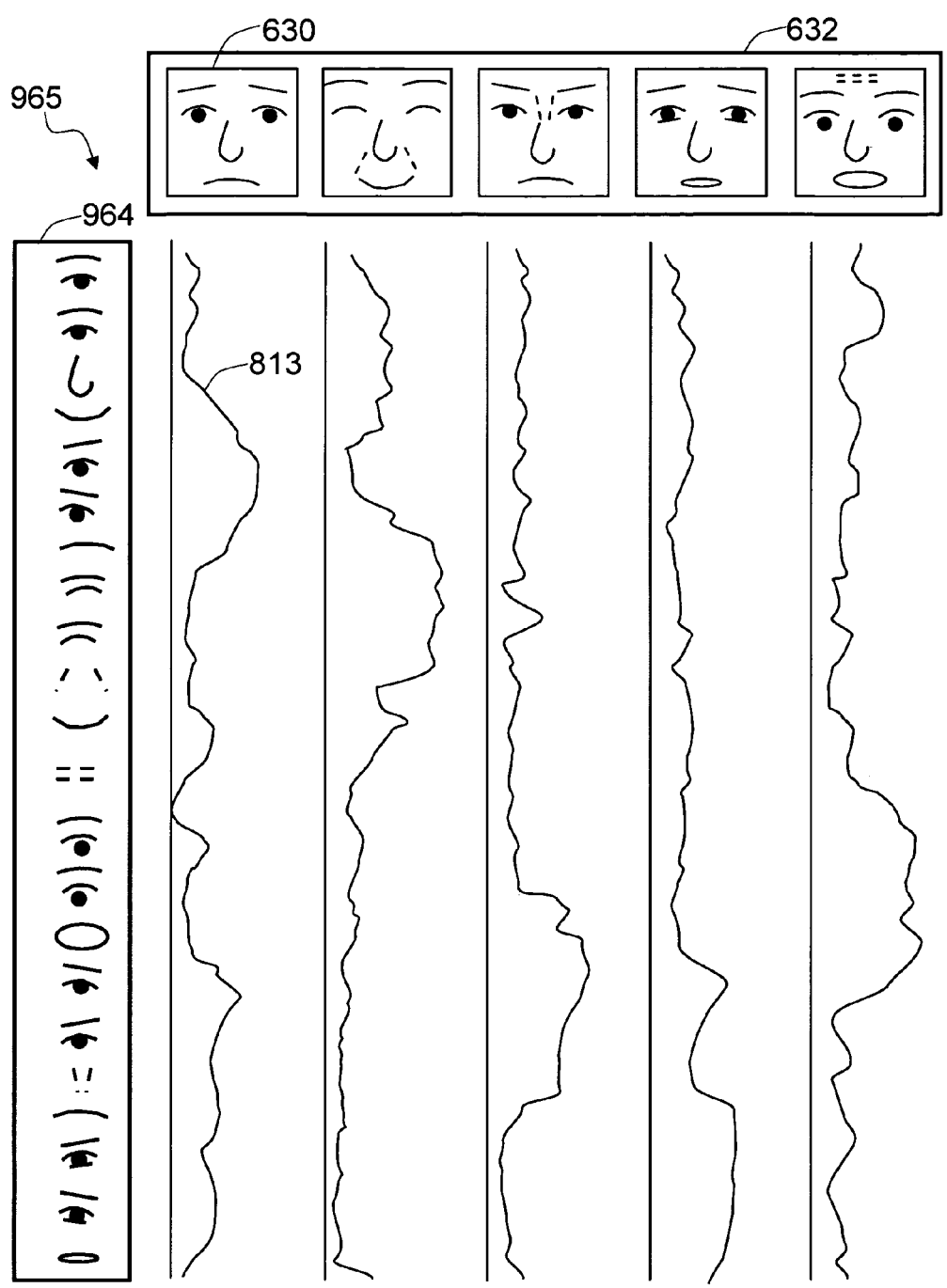
FIG. 9 shows an exemplary embodiment of the emotion-sensitive feature learning step.

FIG. 9 shows an exemplary embodiment of the emotion-sensitive feature learning 965 step. The step aims to derive a set of filters that are matched to facial feature shapes or transient feature (facial wrinkles) shapes, so that the filters can extract the features relevant to facial expressions, and at the same time can ignore other image variations due to lighting, etc. First a large number of emotion-sensitive feature candidate filters 964 are generated that are designed to extract edge responses of the facial features or transient features; the positions and shapes of the filters match the corresponding positions and the shapes of the features. Then the filters are applied to a facial image database 632 of many different people showing a variety of facial expressions. Each facial image 630 goes through the face localization 380 step and facial feature localization 410 step, so that the locations and sizes of the filters match the estimated location and sizes of the facial features of the facial image 630. After the filter responses 813 are collected, the subset of the candidate filters that gave rise to sufficient response to some proportion of facial images are chosen as the emotion-sensitive feature filters 963.

Figure 10:
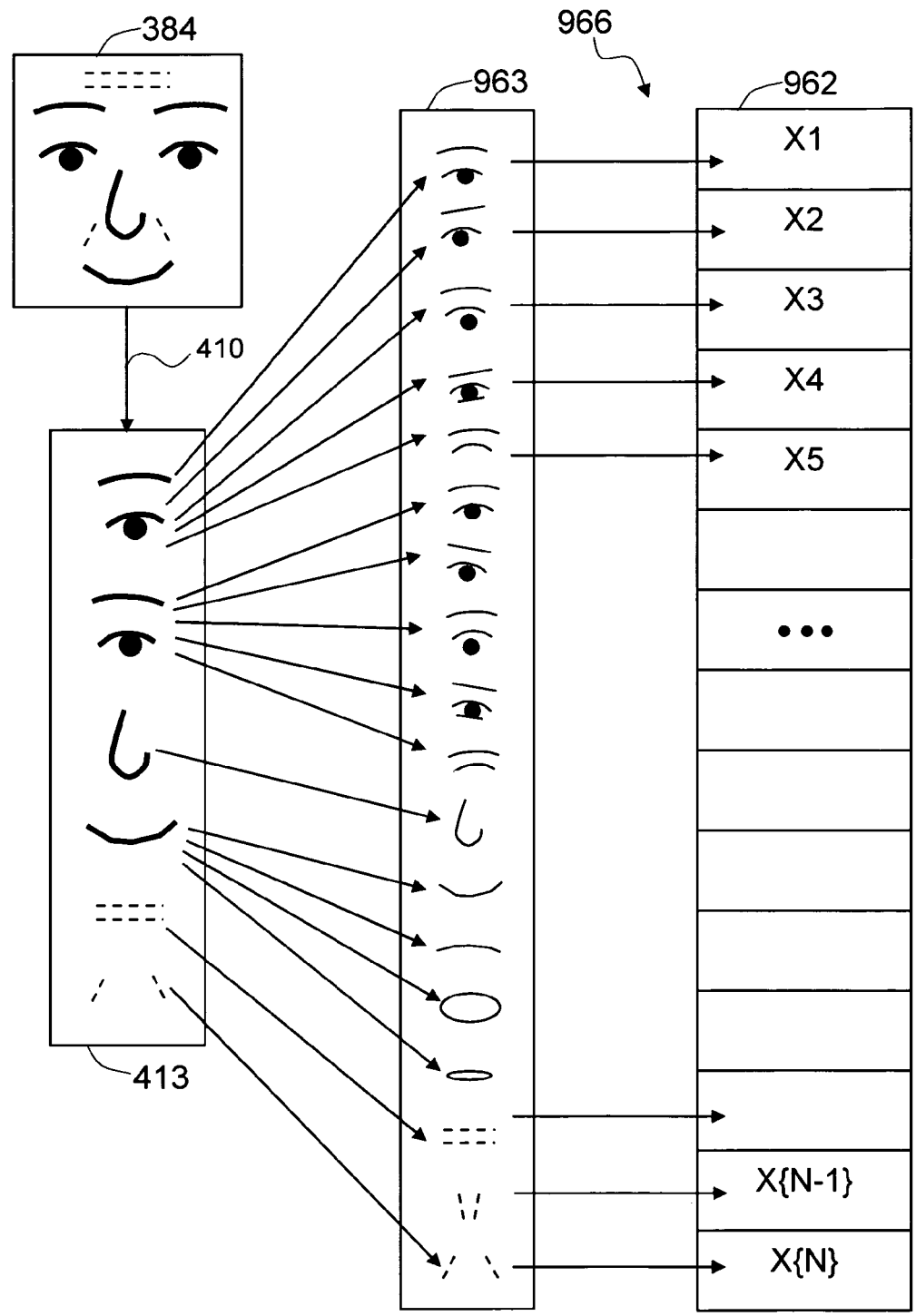
FIG. 10 shows the emotion-sensitive feature extraction scheme once the emotion-sensitive feature filters have been derived.

FIG. 10 shows the emotion-sensitive feature extraction 966 scheme once the emotion-sensitive feature filters 963 have been derived. The localized facial image 384 goes though the facial feature localization 410 step to extract individual features to generate a facial feature localized facial image 413. Then each filter in the emotion-sensitive feature filters 963 is applied to the correspondingly-aligned feature in the image to compute the response. Effectively, the facial image is compared to many potential candidate facial expressions, and those filters matching the true facial expression are designed to yield high responses. All of the responses are collected in the emotion-sensitive feature vector 962.

Figure 11:
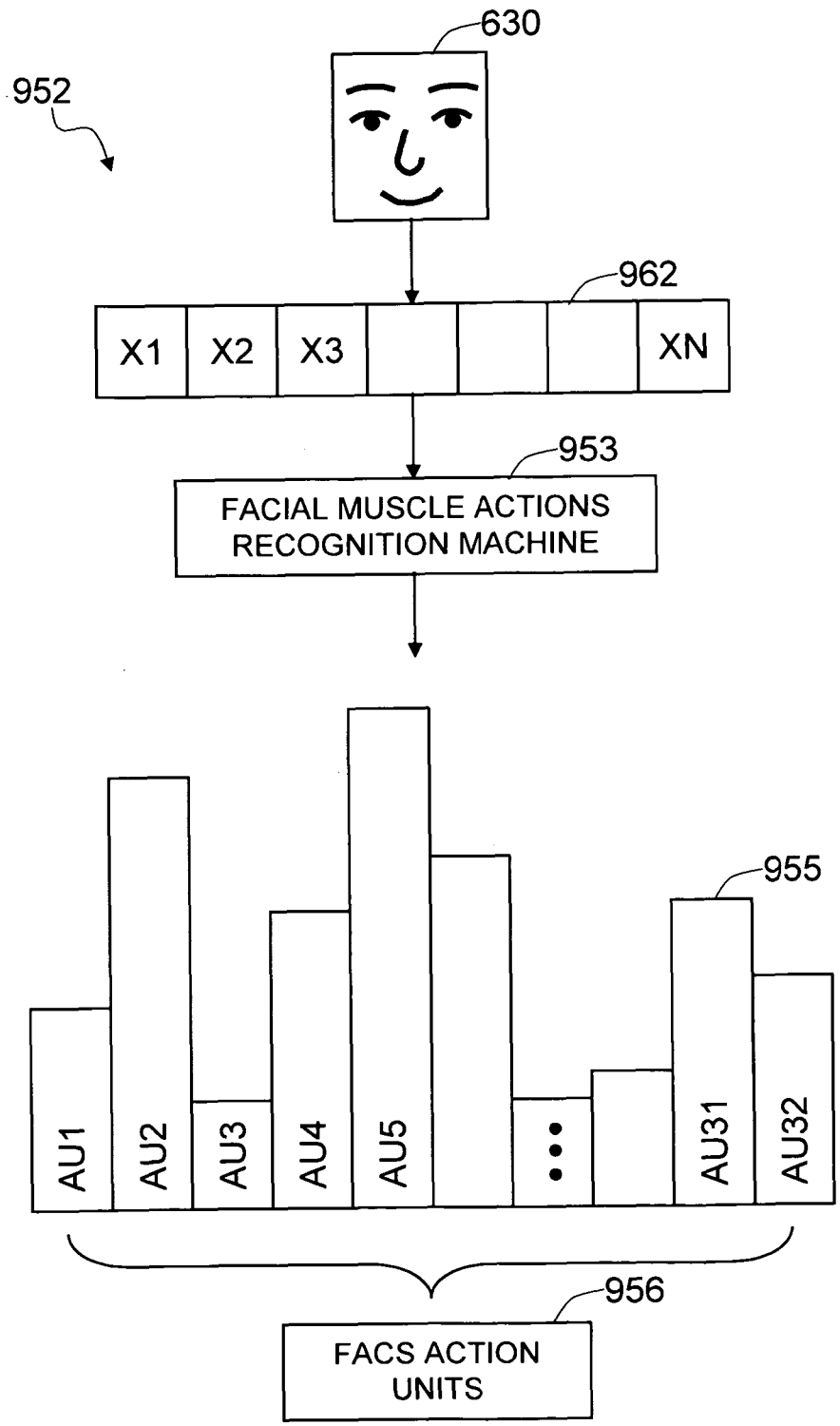
FIG. 11 shows an exemplary embodiment of the facial muscle actions recognition step.

FIG. 11 shows an exemplary embodiment of the facial muscle actions recognition 952 step. Because of the complex relation between the emotion-sensitive feature responses and the facial expressions, it is not straightforward to make a direct connection between the emotion-sensitive filter responses and the facial expressions. A large number of such emotion-sensitive feature vectors 963 along with the ground truth facial muscle actions are utilized to learn the relation within a machine learning framework. This is called the emotion-sensitive features to facial muscle actions learning 968 step, and the product of this step is the facial muscle actions recognition machine 953. Once the emotion-sensitive feature vector 962 has been computed from the input facial image 630, it is fed to the facial muscle actions recognition machine 953 to estimate the likelihood of the facial image having each of the muscle actions. In this exemplary embodiment, the FACS (Facial Action Coding System) Action Units 956 are employed to represent the facial muscle actions 951. In this embodiment, the facial muscle actions recognition 952 outputs the 32-dimensional vector where each component represents the likelihood of the given facial image having the corresponding Action Unit 955. In this exemplary embodiment, the emotion-sensitive features to facial muscle actions learning 968 can utilize the six emotion categories 902 data determined by a human operator to derive the FACS Action Units 956 ground truth data based on the relation laid out in FIG. 12.

FIG. 12 shows a table that lists the association between the set of FACS Action Units 956 and the set of six emotion categories 902, in an exemplary embodiment of the present invention. A subset of the FACS Action Units 956 is listed in each row as a manifestation of each emotion category. The FACS Action Units are divided into primary visual cues 957 and auxiliary visual cues 958. The primary visual cues 957 are the Action Units that always accompany the manifestation of the emotion. The auxiliary visual cues 958 are the Action Units that do not necessarily accompany the expression at all times but can serve as additional evidence. For example, if a facial image shows AU 6, AU 12, then it is very highly likely that the face is expressing "Happiness." The occurrence of AU 25, Au 26, and AU 16 will provide additional evidence to the decision.

Figure 13:
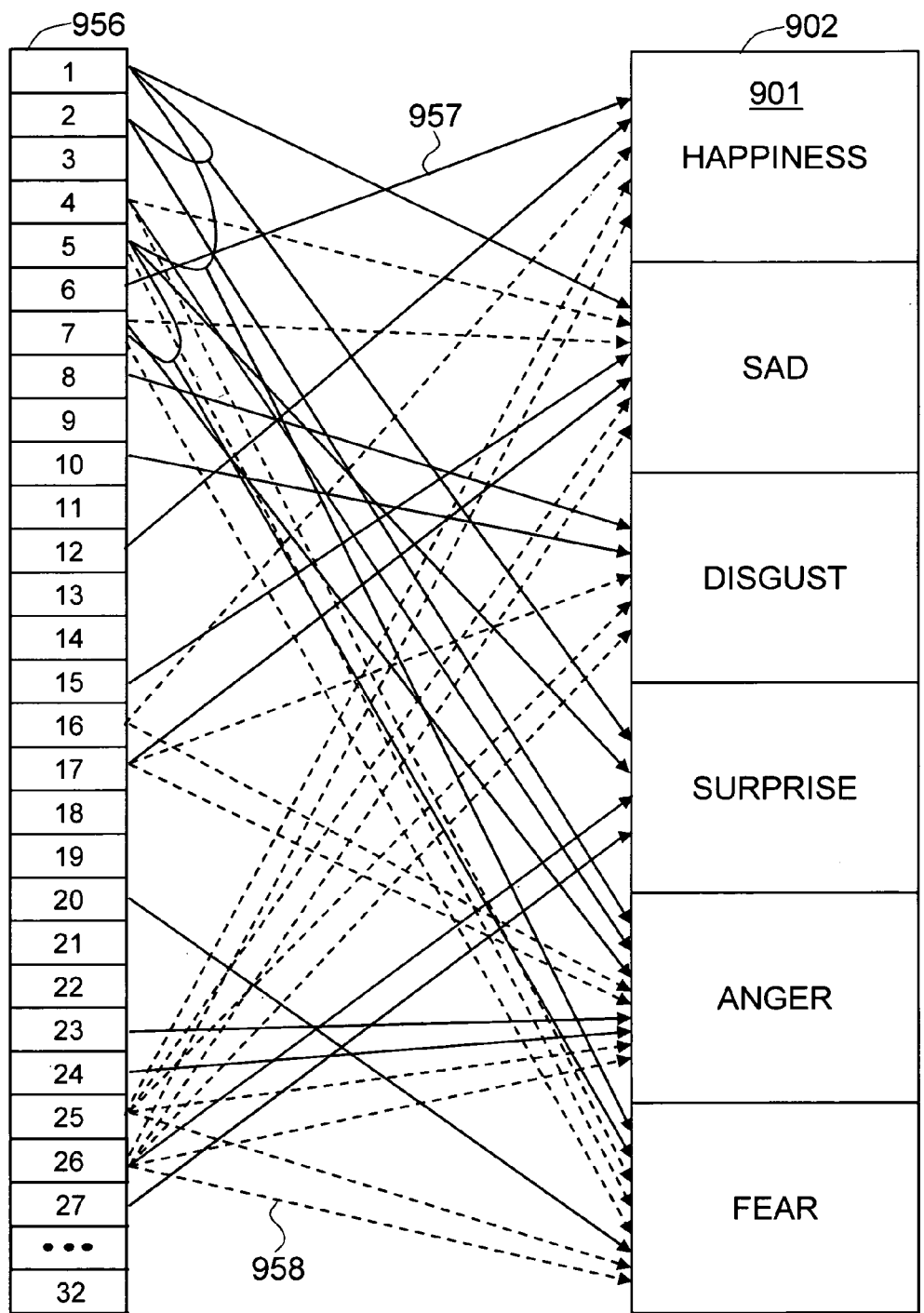
FIG. 13 shows an exemplary embodiment of the mapping from the FACS Action Units to the six emotion categories generated based on the table in FIG. 12.

FIG. 13 shows an exemplary embodiment of the mapping from the FACS Action Units 956 to the six emotion categories 902 generated based on the table in FIG. 12. The strong association between the primary visual cues 957 and the corresponding emotion category 901 is represented by arrows with solid lines. The weak association between the auxiliary visual cues 958 and the corresponding emotion category is represented by arrows with dashed lines.

Figure 14:
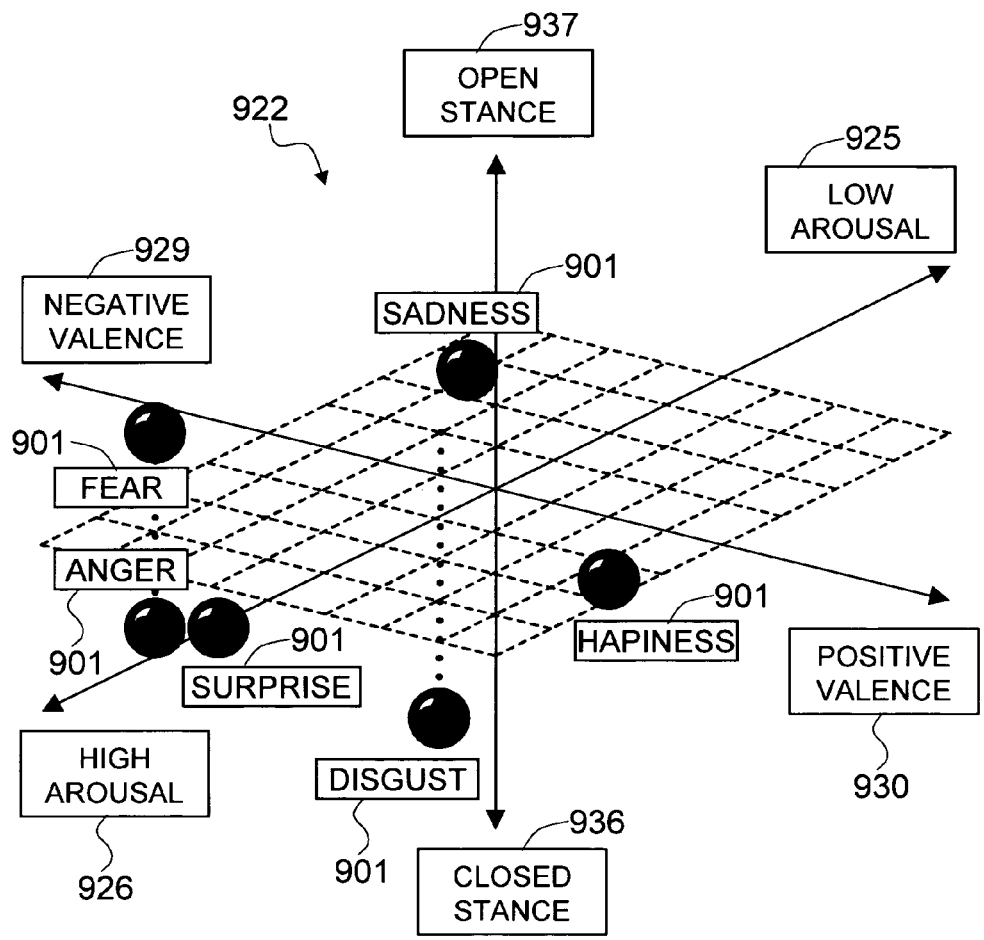
FIG. 14 shows a spatial arrangement of six emotion categories in the three-dimensional affect space.

FIG. 14 shows a spatial arrangement of the six emotion categories in the three-dimensional affect space 922. This relation effectively constrains a mapping from the space of the six-dimensional space of emotion categories to the three-dimensional affect space 922, so that the estimated facial muscle actions 951 can be projected into the affect space 922. The affect space 922 encodes human response characteristics in a more fundamental manner, employing the notions of arousal 924, valence 928, and stance 935; the present invention assumes that these affective states provide information more directly relevant to the recognition of people's responses toward a media display. For example, the degree of valence directly reveals the positive or negative attitude.

Figure 15:
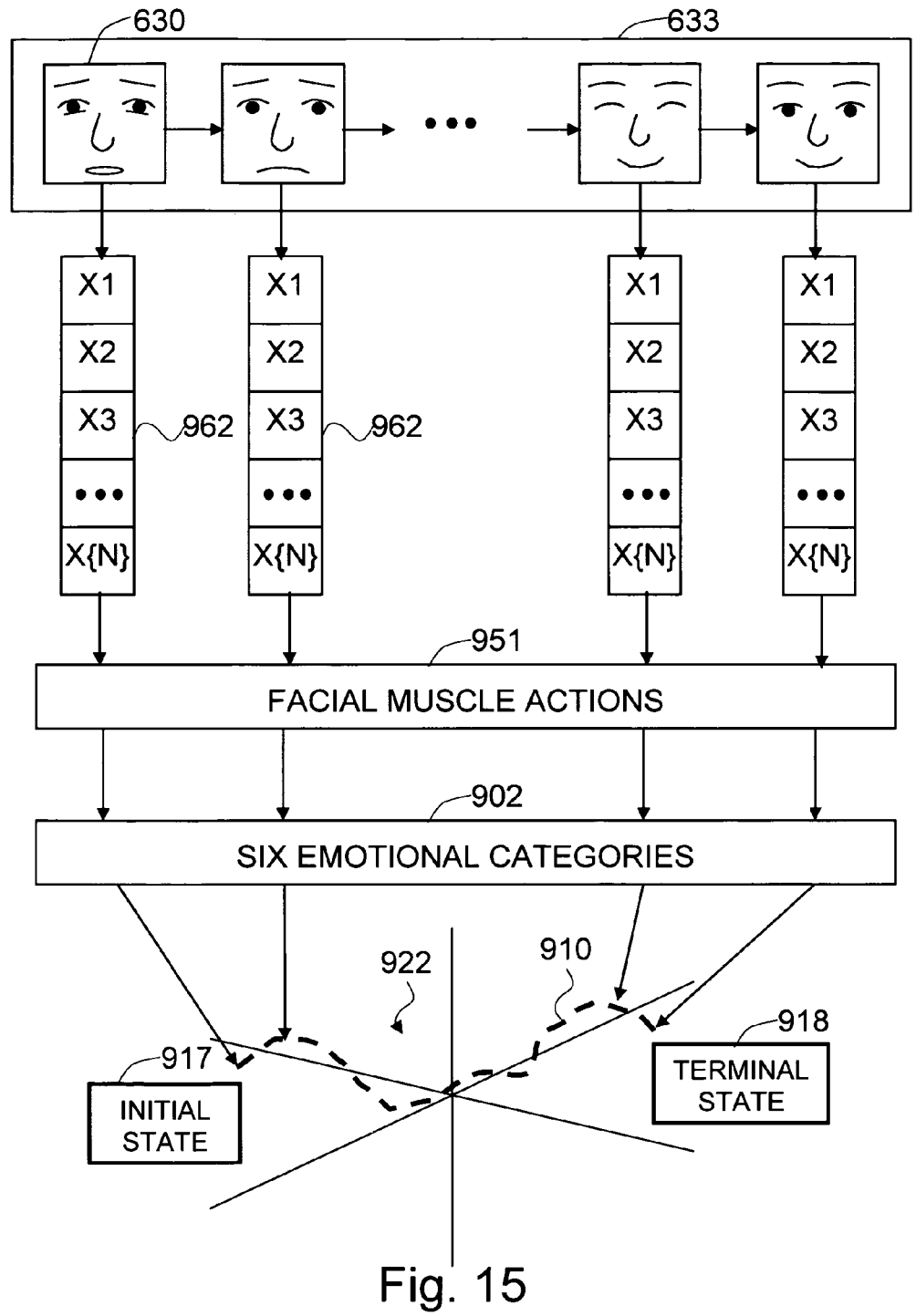
FIG. 15 shows an exemplary embodiment of how the measured instances of facial muscle actions from a sequence of facial images are projected into the affect space to construct an emotion trajectory.

FIG. 15 shows an exemplary embodiment of how the measured instances of facial muscle actions 951 from a sequence of facial images 633 are projected into the affect space 922 to construct an emotion trajectory 910. From a sequence of facial images 633, an emotion-sensitive feature vector 962 is extracted from each facial image 630. The facial muscle actions recognition 952 step then finds the facial muscle actions 951 corresponding to the emotion-sensitive feature vector 962. The facial muscle actions 951 then determine the likelihood of the manifested expression belonging to each of the six emotion categories 902. Then the likelihoods determine the coordinate of the instance of emotion in the affect space 922. A series of such estimations from the sequence of facial images 633 generates an emotion trajectory 910 in affect space 922.

Figure 16:
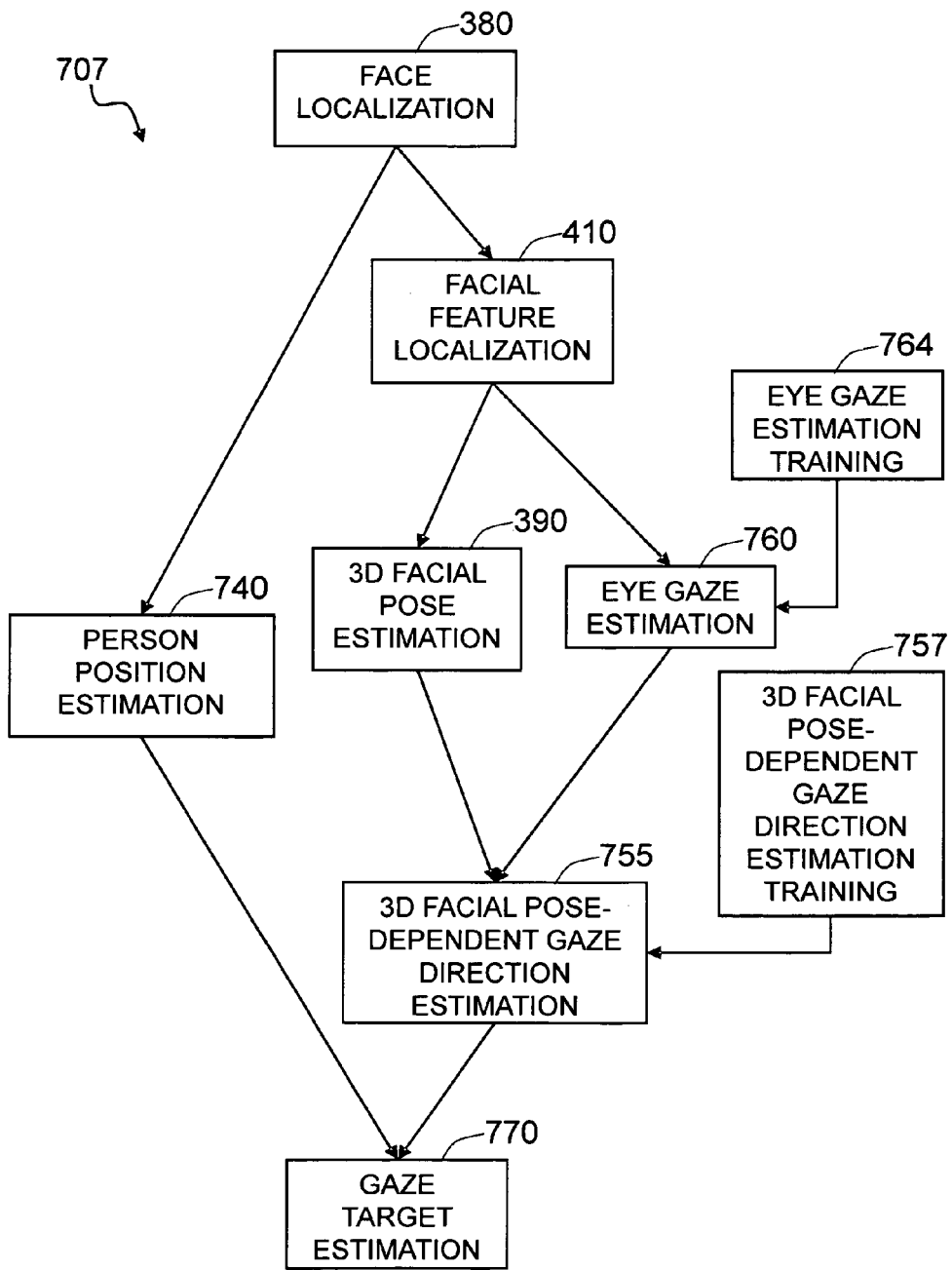
FIG. 16 shows an exemplary embodiment of the gaze and gaze target estimation step.

FIG. 16 shows an exemplary embodiment of the process of gaze and gaze target estimation 707. The face localization 380 step estimates the (X, Y) position, the scale, and the orientation of the face within the face detection window 366, so that the facial feature localization 410 step can accurately identify and estimate the positions and sizes of the facial features. The localized facial features help to estimate the out-of-plane rotation of the face in the three-dimensional facial pose estimation 390 step. The images of accurately localized eyes are also fed to the eye gaze estimation 760 step, so that the eye gaze of the person—to which direction the person is looking—can be measured. The eye gaze estimation 760 is carried out by learning machines trained from the eye gaze estimation training 764 step. Both the estimated three-dimensional facial pose and the eye gaze are combined to estimate the gaze direction relative to the camera in the three-dimensional facial pose-dependent gaze direction estimation 755 step. The three-dimensional facial pose-dependent gaze direction estimation is carried out by learning machines 758 trained from the three-dimensional facial pose-dependent gaze direction estimation training 757 step.

On the other hand, the localized face from the face localization 380 step provides accurate face size and image position information; the position of the person can be computed based on these quantities in the person position estimation 740 step. The estimated position of the person determines where the person is looking based on the estimated gaze direction, in the gaze target estimation 770 step.

Figure 17:
FIG. 17 shows an exemplary sampling of (yaw, pitch) ranges for three-dimensional, facial pose estimation in an exemplary embodiment of the present invention.

FIG. 17 shows an exemplary sampling of (yaw, pitch) ranges for three-dimensional facial pose estimation 390 in an exemplary embodiment of the present invention. In one of the exemplary embodiments, each set (yaw, pitch) of geometric parameters is chosen by a sampling from the ranges of possible values. The range is typically determined by the target pose ranges to be estimated. In the exemplary embodiment shown in the figure, the table shows such sampled pose bins, where each pose dimension is split into 5 pose bins.

Figure 18:
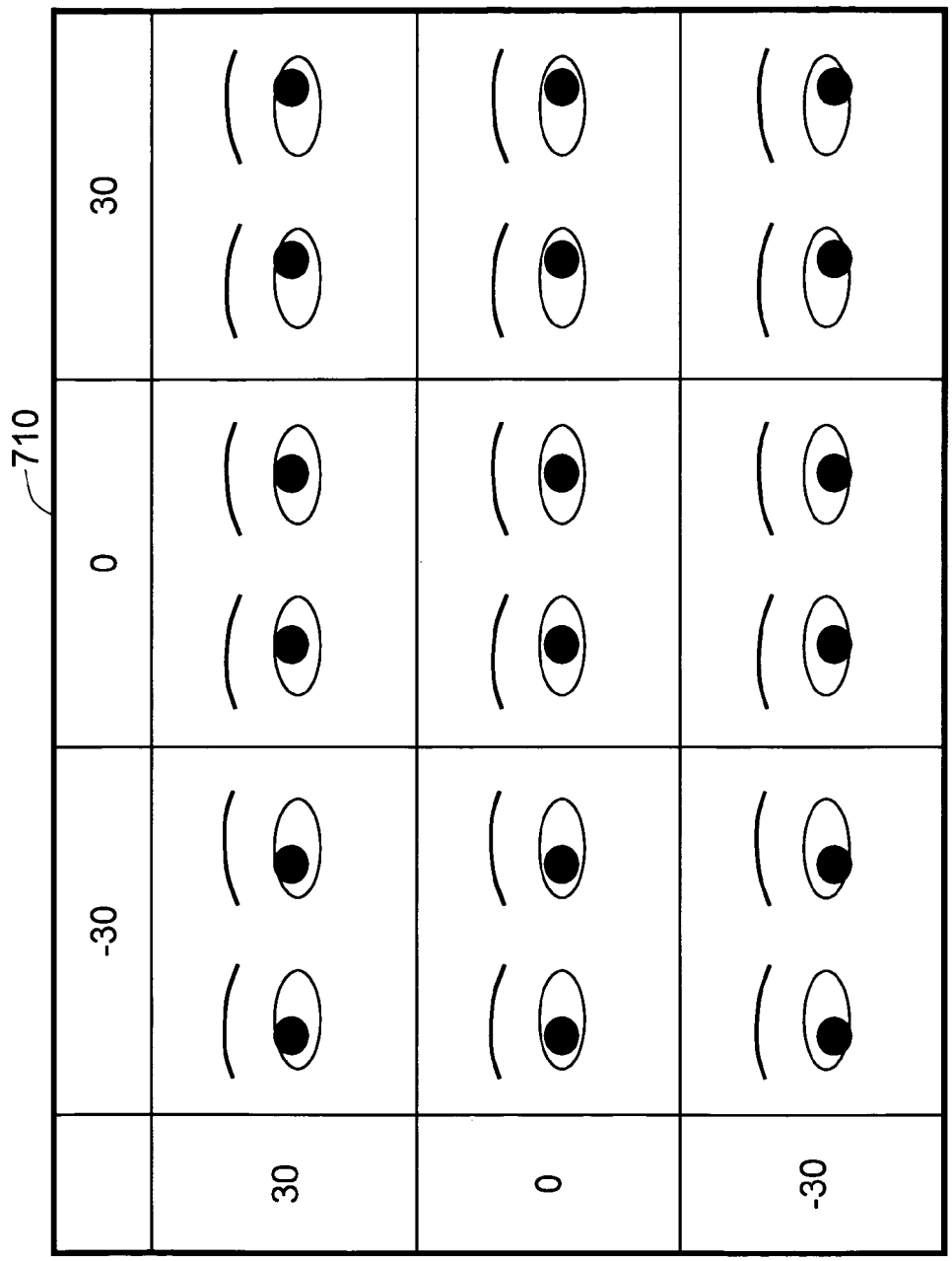
FIG. 18 shows the instances of different eye gaze.

FIG. 18 shows the instances of different eye gaze 710. The columns represent different yaw (horizontal) direction of the eye gaze; the rows represent different pitch (vertical) direction of the eye gaze. Because each eye gaze 710 renders a unique appearance change of the eye, the image signature is used to estimate the eye gaze.

Figure 19:
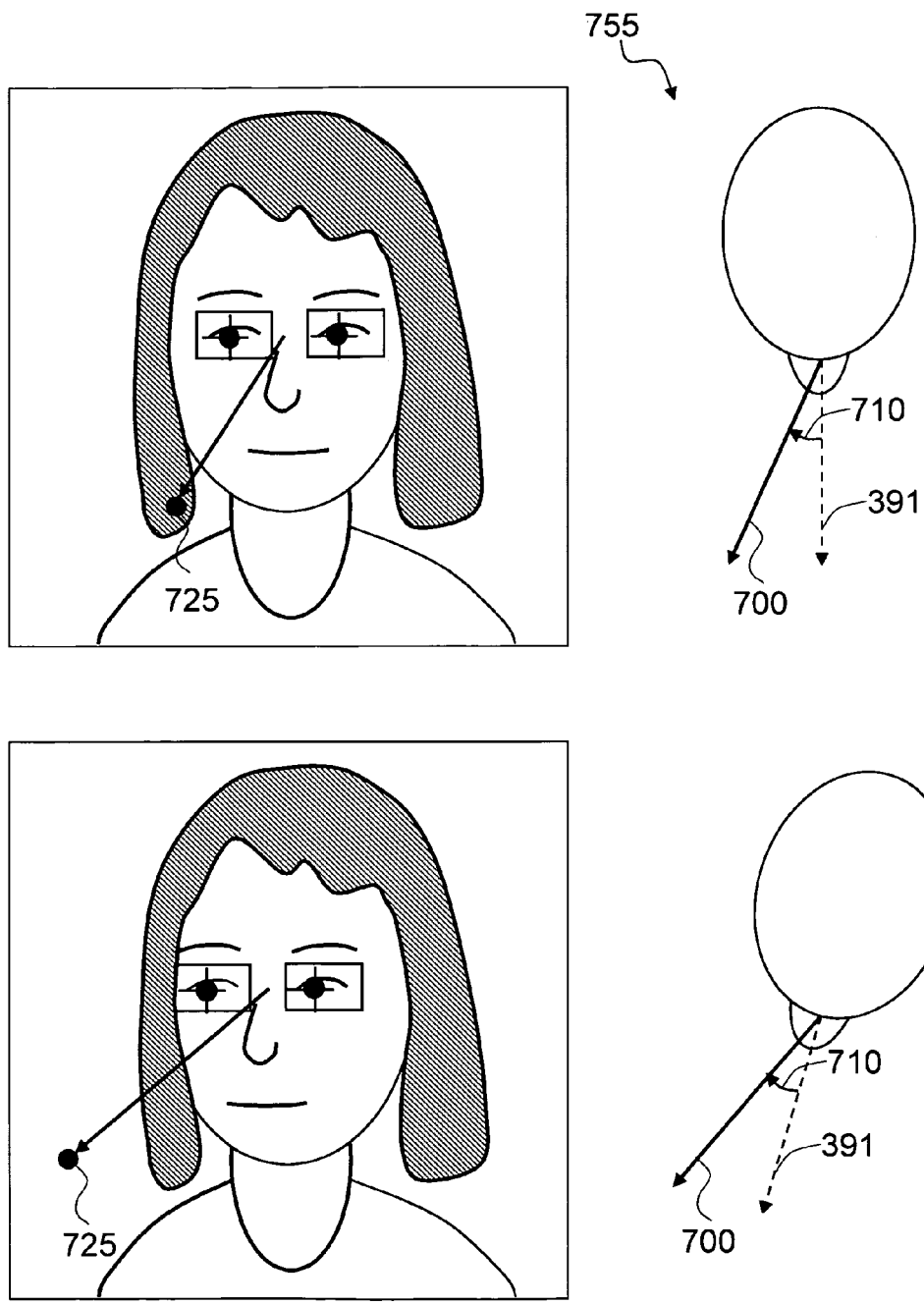
FIG. 19 shows a function of the three-dimensional facial pose-dependent gaze direction estimation step.

FIG. 19 shows a function of the three-dimensional facial pose-dependent gaze direction estimation 755 step. The eye gaze 710 estimated from the eye gaze estimation 760 step is manifested by the movement of the iris, and is independent of the three-dimensional facial pose. Therefore, the two instances of the same eye gaze can actually point to a different gaze target 725 depending on the three-dimensional facial pose 391. In the figure, the top face shows the frontal pose, and the corresponding eye gaze reveals that the person is looking to the right. Therefore, the eye gaze 710 is the only element to estimate the gaze direction 701. In the bottom face, the face is pointing to the right. The eye gaze 710 of the person appears to be very similar to the first face, but needs to be interpreted differently from the case with the top face; the three-dimensional facial pose 391 should be additively incorporated to the final estimate of gaze direction. The way to combine the eye gaze 710 and the three-dimensional facial pose 391 can be learned using a learning machine-based method.

Figure 20:
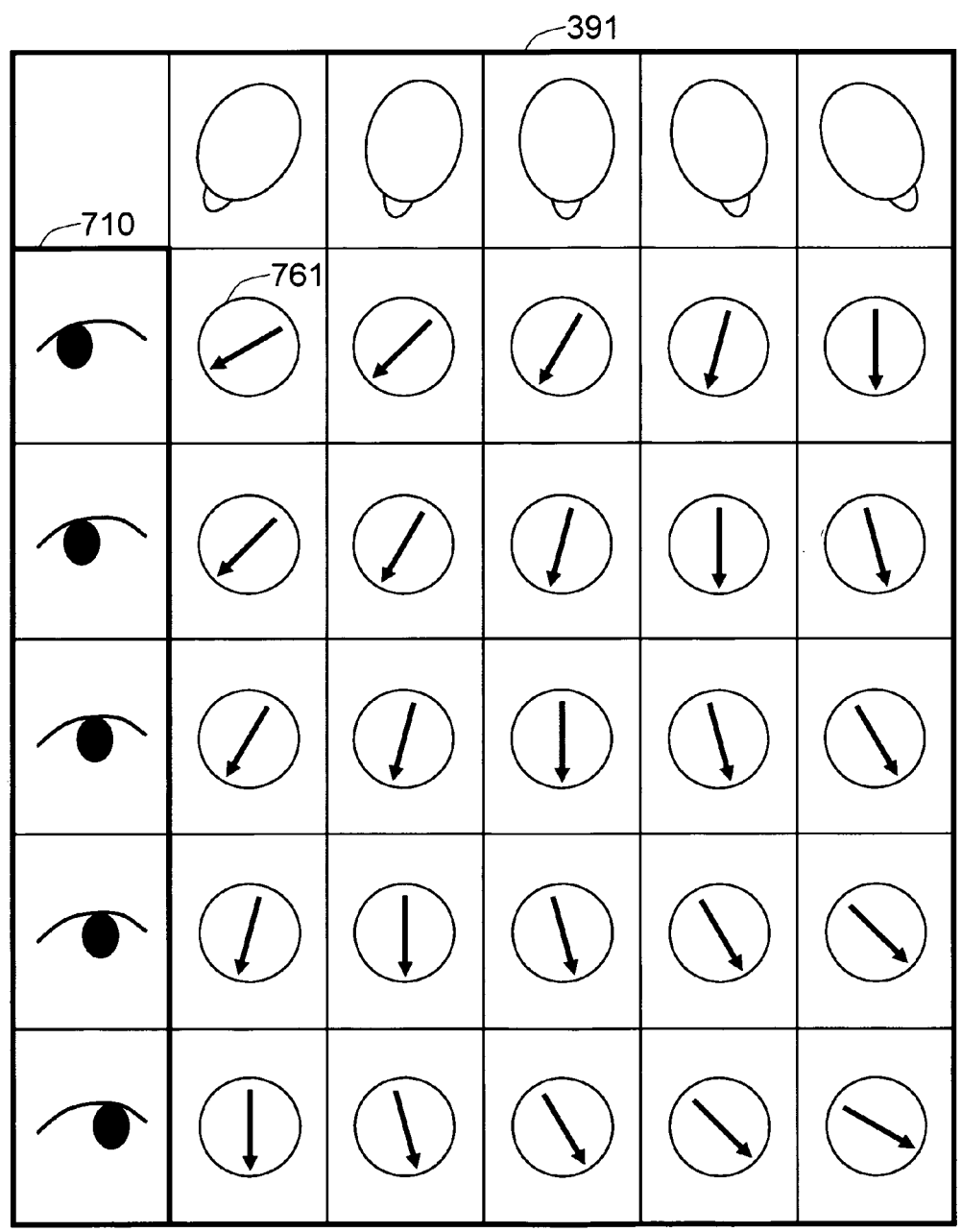
FIG. 20 shows an exemplary scheme of the three-dimensional facial pose-dependent gaze direction estimation step.

FIG. 20 shows an exemplary scheme of the three-dimensional facial pose-dependent gaze direction estimation 755 step. Each column represents a different three-dimensional facial pose 391 (different yaw angles), and each row represents a different eye gaze 710. The orientation of each gaze direction estimate 761 corresponding to the three-dimensional facial pose and eye gaze is illustrated using an arrow in a circle. The middle (third) column shows a frontal facial pose, and the horizontal position of the iris relative to the eye simply translates to the gaze direction. When the face is pointing to the right (first column), it gives additive bias (to the right of the person) to the gaze direction estimate.

Figure 21:
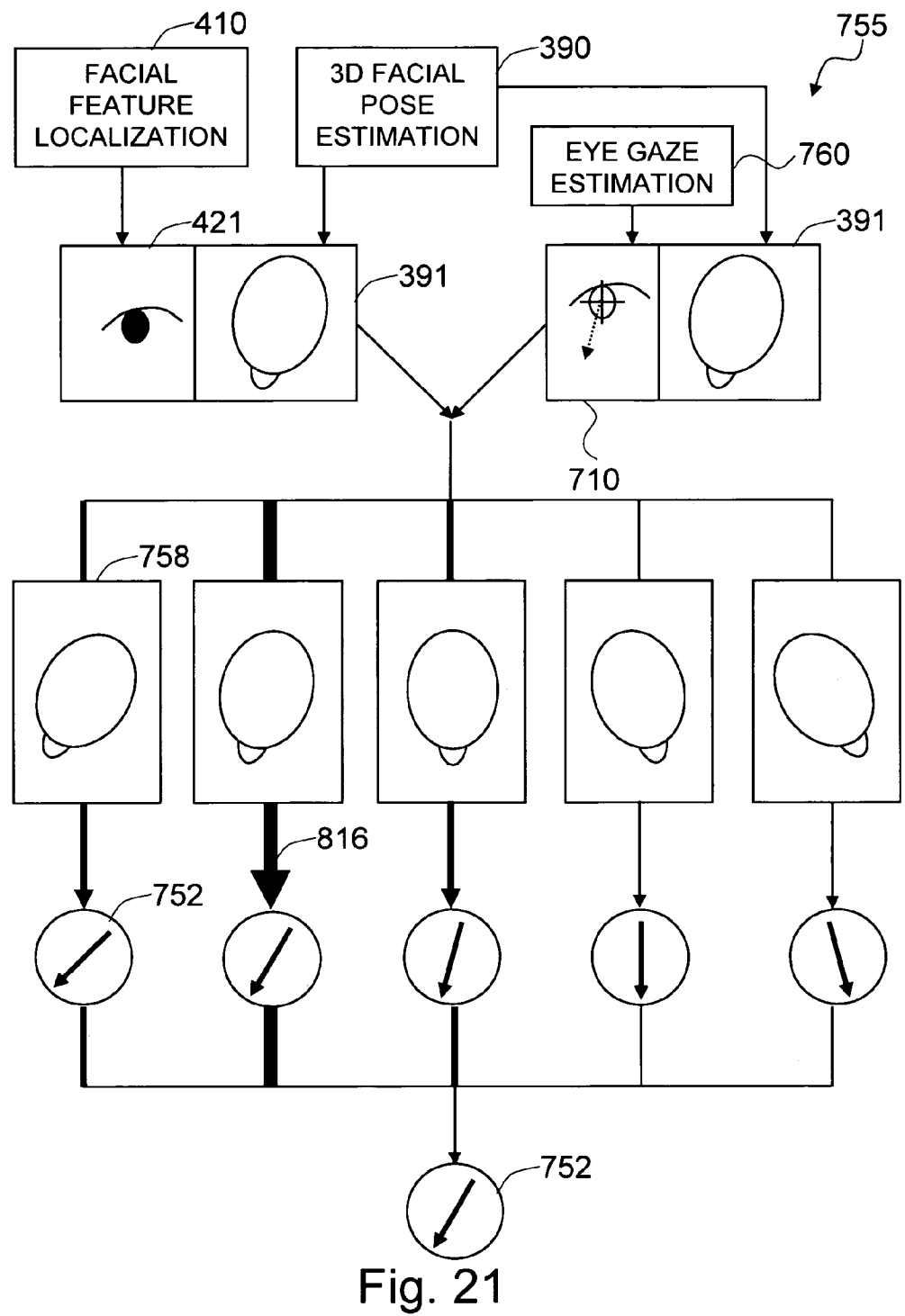
FIG. 21 shows an exemplary embodiment of the three-dimensional facial pose-dependent gaze direction estimation step.

FIG. 21 shows an exemplary embodiment of the three-dimensional facial pose-dependent gaze direction estimation 755 step. In this embodiment, multiple learning machines are used, where each machine is a three-dimensional facial pose-dependent learning machine 758 that is trained for a particular three-dimensional facial pose 391. Once the eye gaze 710 and the three-dimensional facial pose 391 are estimated from face view 342, they are fed to each of the machines. In one embodiment, only the machine whose pose range contains the estimated three-dimensional facial pose 391 is activated to estimate the gaze direction. In another embodiment, all of the machines are activated, but the output gaze direction estimates are weighted to produce the gaze direction estimate; the weight 816 is proportional to a measure of similarity between the estimated three-dimensional facial pose and the inherent pose of the machine. In the figure, the weight 816 is denoted as the thickness of the arrow.

In a scenario when the eye images are not large enough for reliable eye gaze estimation, the normalized eye image 421 (instead of estimated eye gaze) along with the three-dimensional facial pose are fed to the machines to estimate the gaze direction. In this embodiment, the machines are trained to process the normalized eye image 421 and the three-dimensional facial pose estimate 391, instead of being trained to process the eye gaze 710 and the three-dimensional facial pose estimate 391.

Figure 22:
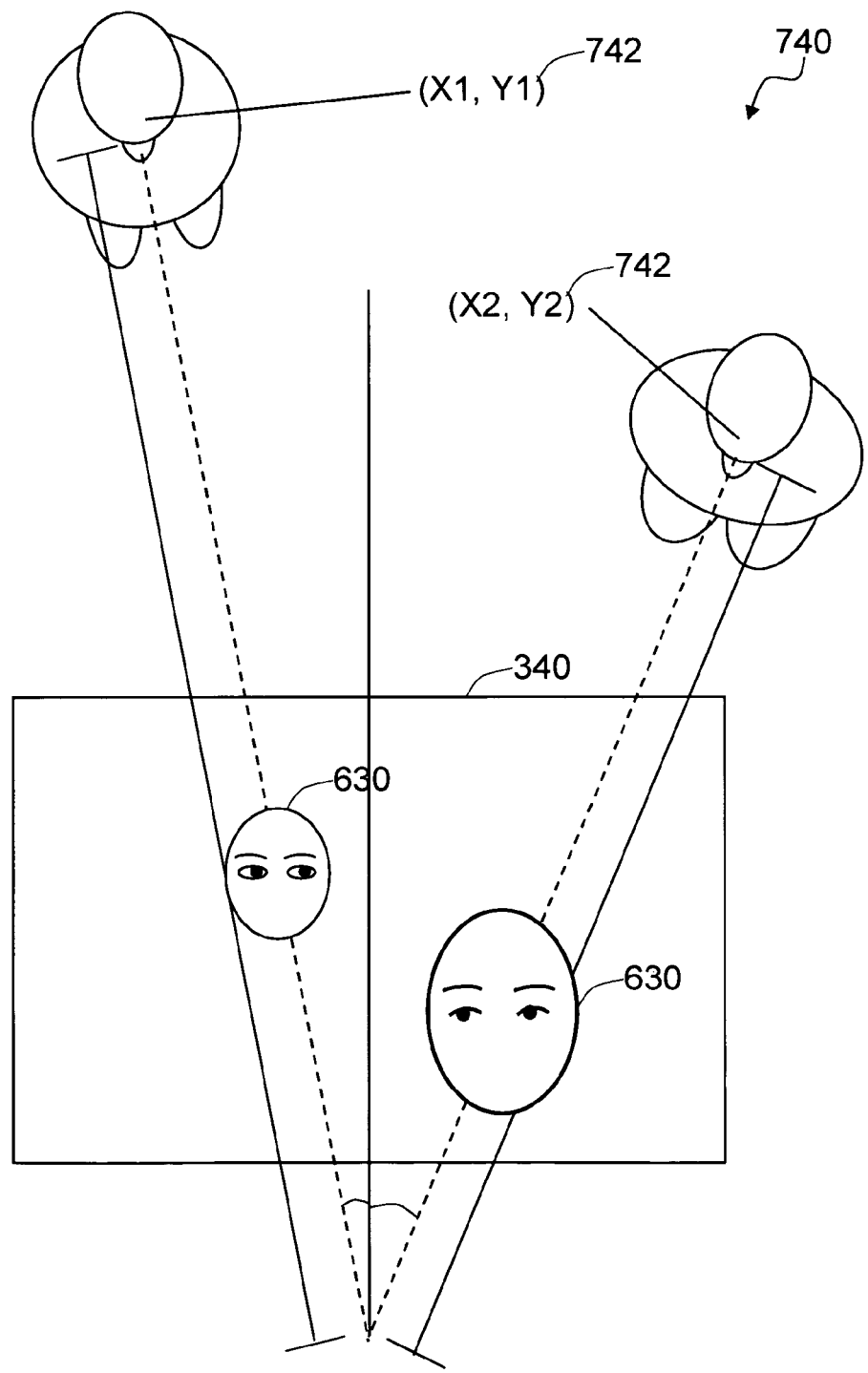
FIG. 22 shows the person position estimation and gaze target estimation steps in an exemplary embodiment of the present invention.

FIG. 22 shows the person position estimation 725 and gaze target estimation 770 steps in an exemplary embodiment of the present invention. The steps provide the positional information of each person in the audience, so that the estimated gaze direction of the person can be translated to the gaze target—a position where the person is looking—based on the floor position. The person position is estimated based on the screen position of the person's face and the face size computed from the face localization step. The screen position provides the deviation angle of the face from the camera's optical axis, and the face size provides the distance of the face from the camera. The polar coordinate (distance, angle) is converted to the (X, Y) position of the person in the world coordinate.

Figure 23:
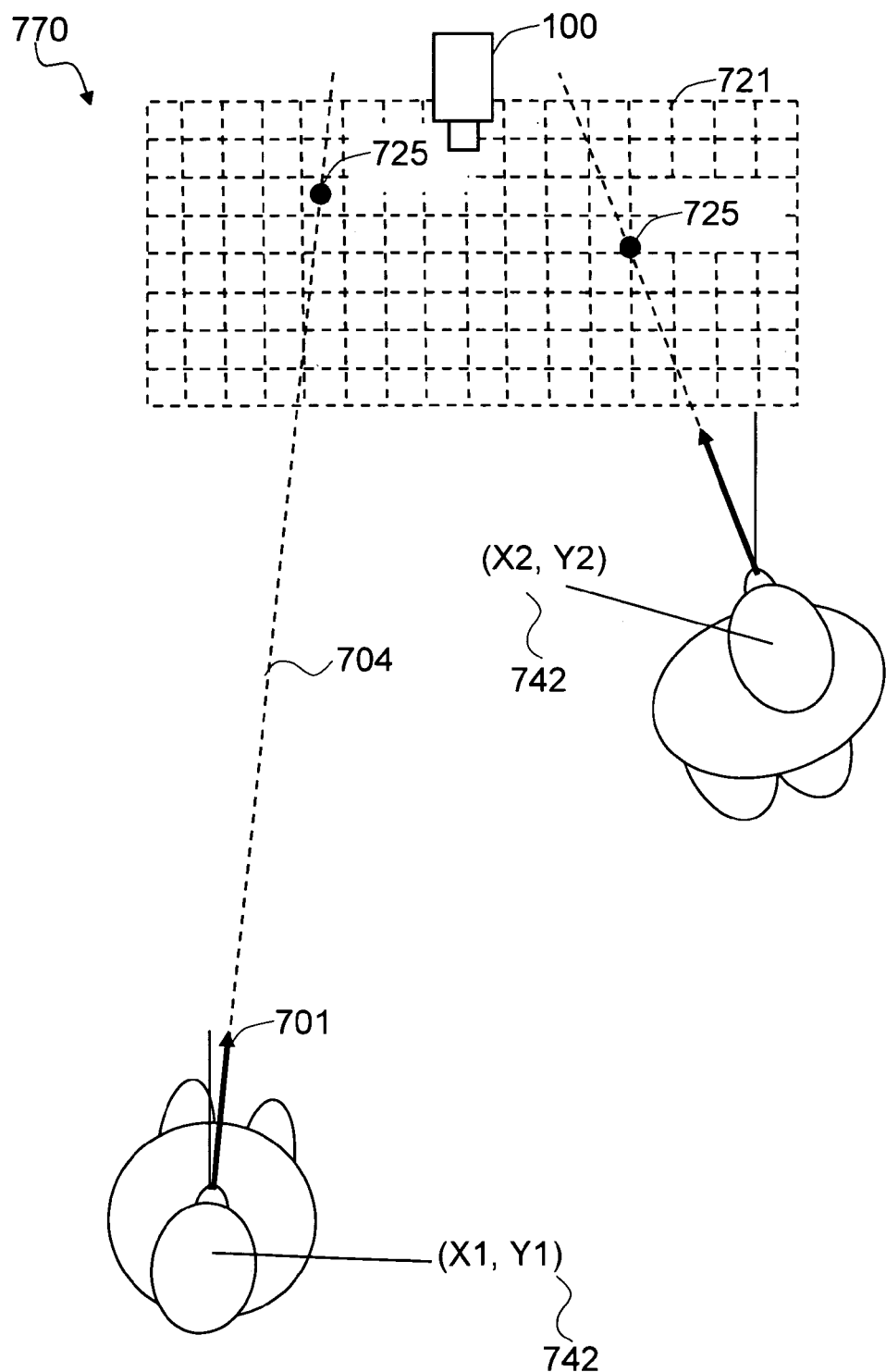
FIG. 23 shows the person position estimation and gaze target estimation steps in an exemplary embodiment of the present invention.

FIG. 23 shows the gaze target estimation 770 step in an exemplary embodiment of the present invention. The person position estimation 740 step provides the world coordinate of the person 742—more precisely, the position of the head 735. The gaze direction estimation 750 step provides the gaze direction 701, which is the orientation of gaze direction relative to the means for capturing images 100. The visual target 720 depends on the orientation of the means for capturing images 100 and the position of the person as shown in the figure; first the gaze direction 701 is interpreted using the gaze to target grid mapping 774 to estimate the gaze line 704. The coordinate of the gaze target is estimated by finding the intersection of the gaze line 704 with the visual target plane 721. The gaze line 704 is a line originating from the person's position having the same orientation as the estimated gaze direction.

Figure 24:
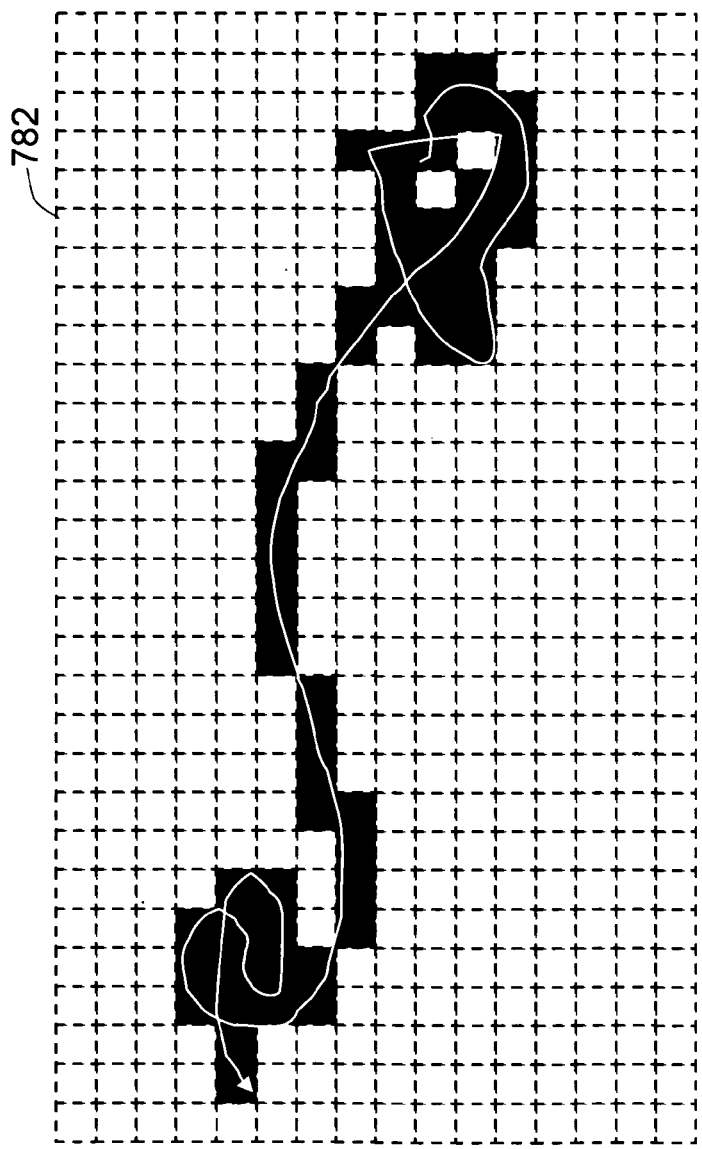
FIG. 24 shows an estimated gaze trajectory of a single person.

FIG. 24 shows an estimated gaze trajectory 782 of a single person. The plot can reveal how the interest of the viewer changes over the time span of viewing.

Figure 25:
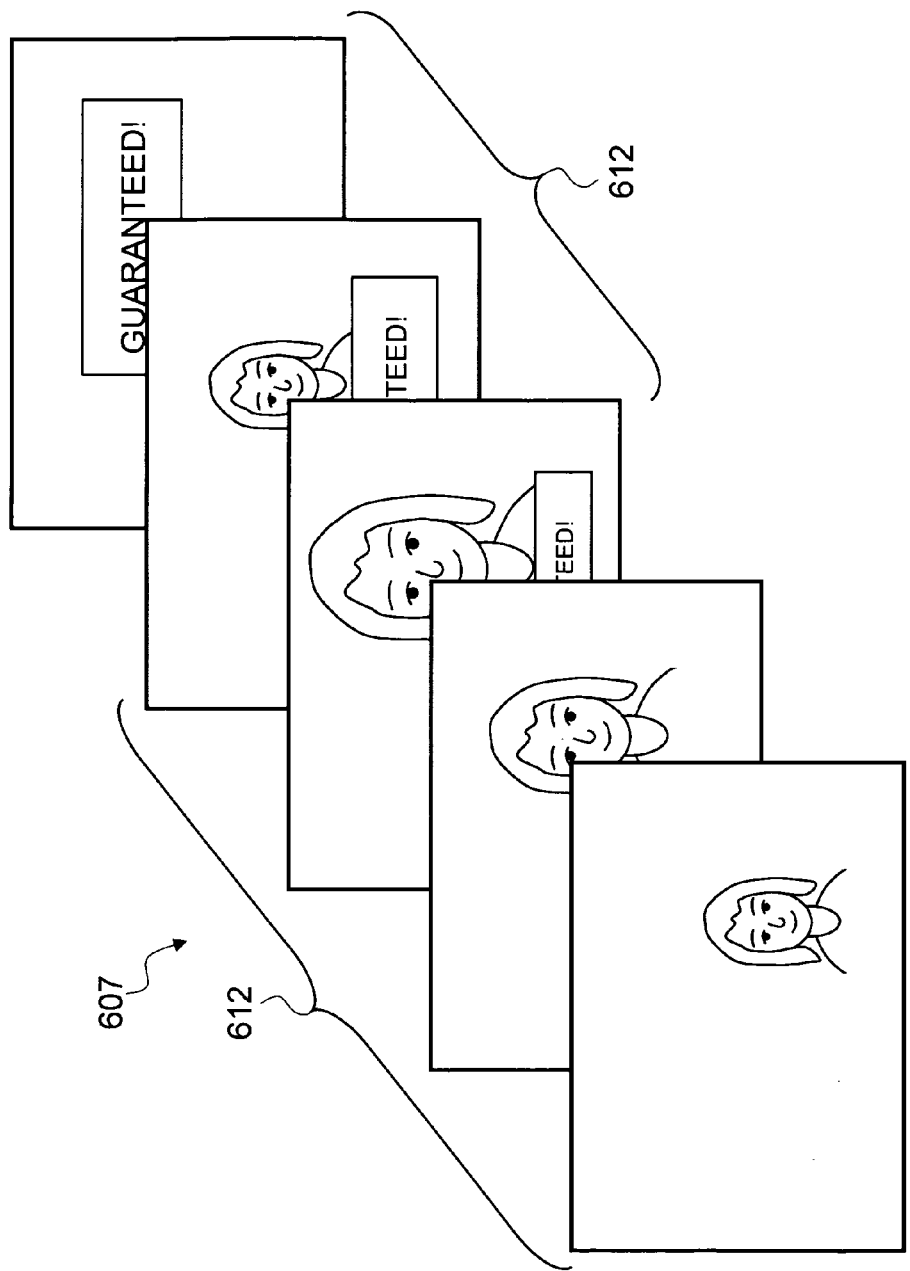
FIG. 25 shows the spatiotemporal changes of media content.

FIG. 25 shows the spatiotemporal changes of media content. The media programming changes its content to effectively deliver intended advertisement to the media audience. In the figure, the appearance of a lady in the screen comprises a single spatiotemporal content. The subsequent appearance of text is another spatiotemporal content, whose impact on the audience can be measured separately from another. In the same manner, the whole episode of a video advertisement can be decomposed into separate spatiotemporal content. In one embodiment, a media program can be simply decomposed into scenes, in the same way that a movie or drama can be split into scenes. Such decomposition of the media content can be provided from the content production material, such as a production plan or storyboard. The decomposed spatiotemporal content along with their start/end timestamps and (changing) screen positions constitute the spatiotemporal media content map 615.

Figure 26:
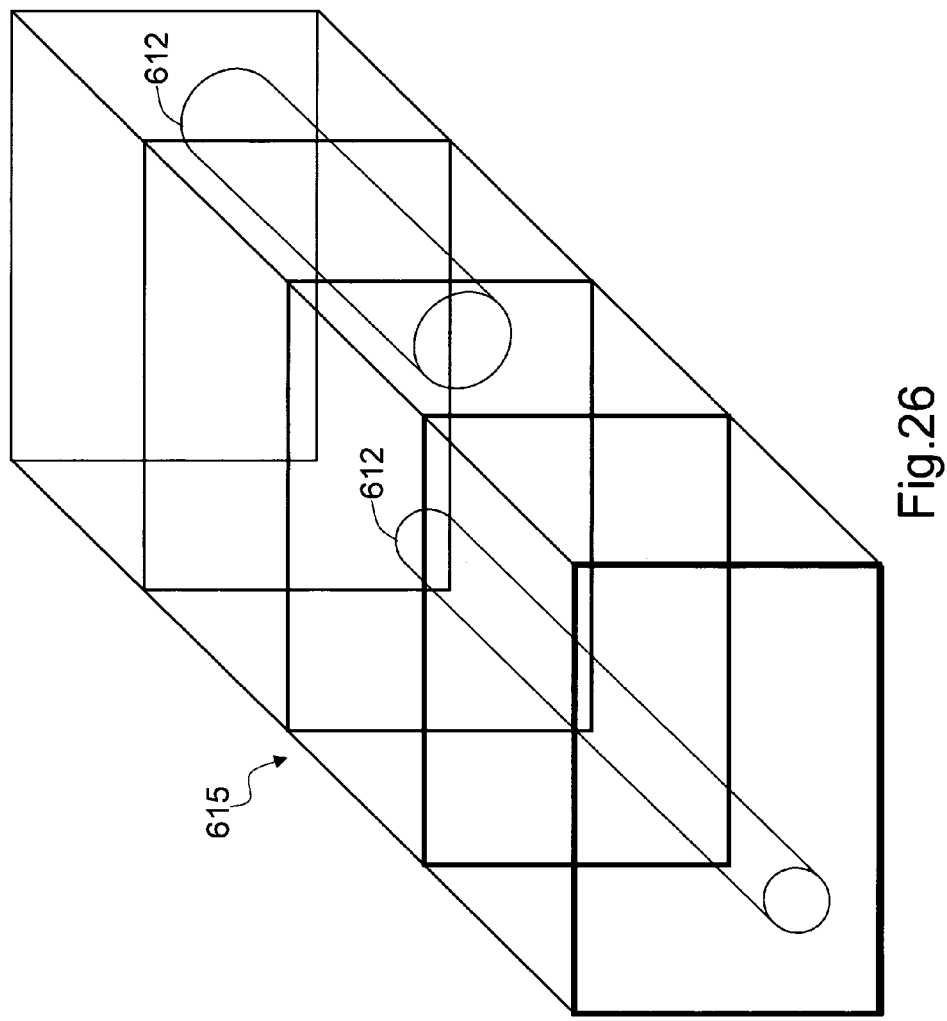
FIG. 26 shows the spatiotemporal media content map.

FIG. 26 shows an exemplary embodiment of the spatiotemporal media content map 615. Each decomposed spatiotemporal media content 612 in terms of time and screen positions is shown in the space of (X, Y, t) in the form of a (curved) cylinder. The start and end of the line/cylinder represent the start/end timestamps of the content. The location of the line/cylinder at each time instant represents the screen position of the content. The volume of the cylinder can represent the spatial extent of the content. For example, if the spatial content is a close-up person, then the corresponding volume of the cylinder will occupy much of the screen size. The (X, Y) position and the volume of the cylinder can change over time according to the changes in content.

Figure 27:
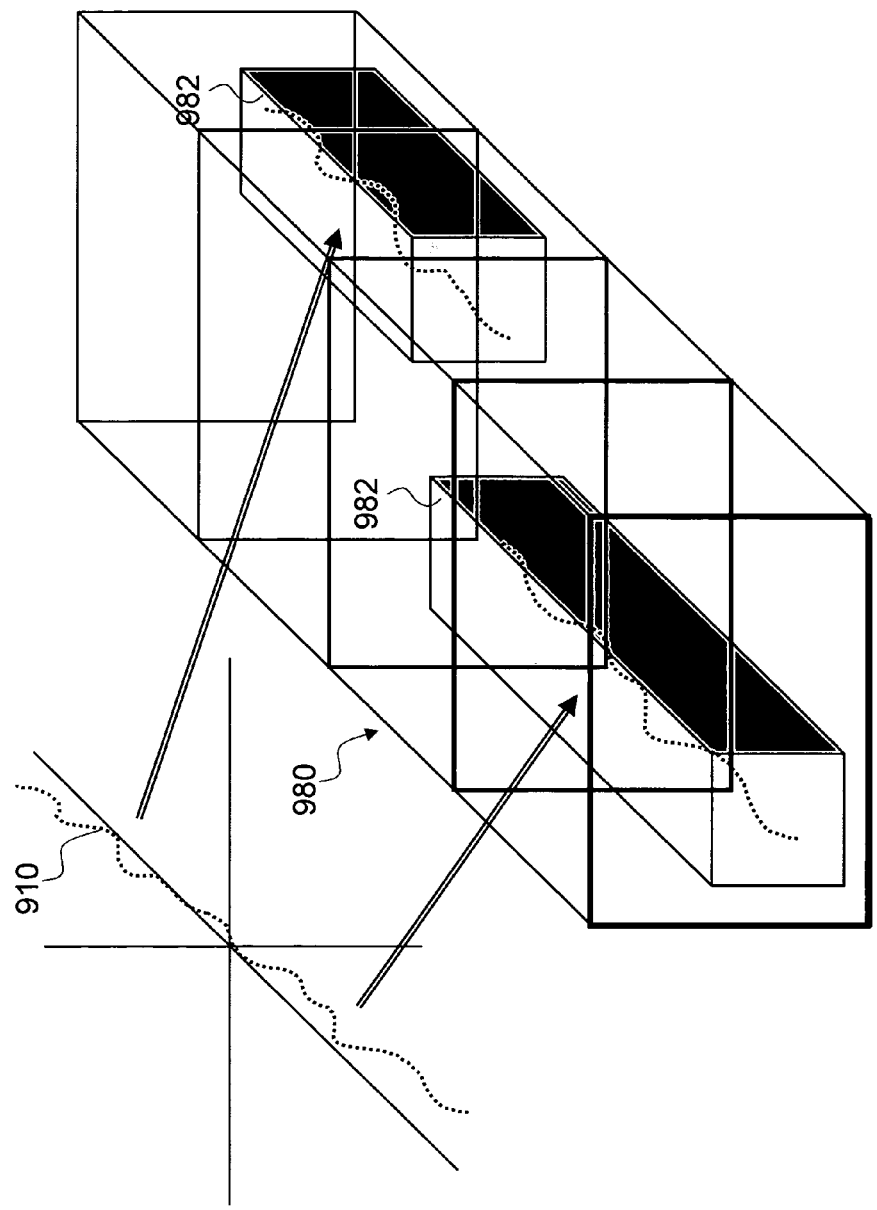
FIG. 27 shows the spatiotemporal emotional response map computed for each spatiotemporal media content.

FIG. 27 shows an exemplary embodiment of the spatiotemporal media response map 980, consisting of each spatiotemporal media response trajectory 982 for a spatiotemporal media content. Once the emotion trajectory 910 of a person watching the media display is computed, it is segmented into each spatiotemporal media response trajectory 982. The segmentation is performed based on the spatiotemporal media content map 615 and the estimated gaze trajectory 782, where each portion of the emotion trajectory is assigned to a spatiotemporal media content 612 so that the estimated gaze target at an instance matches the screen position of the spatiotemporal media content 612 specified by the spatiotemporal media content map 615. Each spatiotemporal media response trajectory 982 represents the emotional response of the person to the given spatiotemporal media content 612. Both the emotion trajectory 910 and the spatiotemporal media response trajectories 983 are shown in three-dimensional space of two affect space dimensions (instead of three dimensions) and a time dimension for clear presentation.

FIG. 28 shows an exemplary spatiotemporal emotional response histogram 985 construction scheme. After repeated exposure of the media content to the media audience, each spatiotemporal media content 612 collects multiple spatiotemporal media response trajectories. It is not straightforward to derive a certain conclusion about the spatiotemporal media content from these collective responses due to the complexity of the data; the responses are multiple trajectories (spatiotemporal media response trajectories 983) from many people. One way to summarize the collective responses is to construct a histogram of the net changes of the emotion—the histogram of emotion change vectors 919. The emotion change vectors 919 are a collection of vectors where each vector's starting point is the initial affective state of a person and the end point is the terminal affective state. The histogram constructed from such emotion change vector 919 constitutes a spatiotemporal media response histogram 985. The mode of the histogram will represent a representative emotion change in response to the given spatiotemporal media content 612, and the spread of the histogram will represent the consistency or agreement of the representative emotion change over many people in the audience.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining emotional and attentional response of audience to dynamic digital media content, comprising the following steps of:
   a) detecting and tracking faces from input images of the audience captured by at least a means for capturing images, and localizing the faces and facial features,
   b) extracting emotion-sensitive features from the faces and determining facial muscle actions of the faces based on the emotion-sensitive features,
   c) finding changes in affective states, called emotion trajectories, of the audience based on the facial muscle actions,
   d) estimating eye gazes and three-dimensional poses of the faces, and estimating gaze directions of the faces based on the estimated eye gazes and the three-dimensional poses of the faces,
   e) estimating gaze targets of the audience based on the estimated gaze directions and the position of the faces, and
   f) determining the response of the audience to the dynamic digital media content, by analyzing the emotion trajectories in relation to time and screen positions of a specific digital media sub-content.

2. The method according to claim 1, wherein the method further comprises a step of deriving and employing image filters to extract emotion-sensitive features, by first generating emotion-sensitive candidate filters and by choosing the emotion-sensitive feature filters from the emotion-sensitive candidate filters that yield high responses to a sufficient number of facial images.

3. The method according to claim 2, wherein the method further comprises a step of generating emotion-sensitive candidate filters by constructing a set of filters,
   wherein each filter is designed to collect gradient response of a specific facial feature or a transient feature.

4. The method according to claim 1, wherein the method further comprises a step of training a machine so that the machine accepts the emotion-sensitive features as an input and computes a vector output,
   wherein each component of the vector is the likelihood of the emotion-sensitive features arising from a specific facial muscle action.

5. The method according to claim 4, wherein the method further comprises a step of estimating the Action Units in the Facial Action Coding System as facial muscle actions.

6. The method according to claim 1, wherein the method further comprises a step of determining affective states of the faces by using the mapping from the facial muscle actions to the six emotional categories.

7. The method according to claim 1, wherein the method further comprises a step of determining affective states of the faces by using the coordinates of six emotional categories in the affect space.

8. The method according to claim 1, wherein the method further comprises a step of training at least a machine for estimating the eye gazes from eye images.

9. The method according to claim 1, wherein the method further comprises a step of training at least a machine for estimating the gaze directions.

10. The method according to claim 9, wherein the method further comprises a step of training the machine for estimating the gaze directions from the eye gaze and the three-dimensional facial pose.

11. The method according to claim 9, wherein the method further comprises a step of employing the machine for estimating the gaze directions from the eye images and the three-dimensional facial poses.

12. The method according to claim 1, wherein the method further comprises a step of estimating the floor positions of people in the audience based on sizes of the faces and positions of the faces in the input images.

13. The method according to claim 1, wherein the method further comprises a step of constructing gaze trajectories based on the estimated gaze targets.

14. The method according to claim 1, wherein the method further comprises a step of segmenting the emotion trajectories in relation to the time and screen positions of the specific digital media sub-content.

15. The method according to claim 14, wherein the method further comprises a step of accumulating the emotion trajectories from multiple people in the audience segmented for the specific digital media sub-content.

16. The method according to claim 14, wherein the method further comprises a step of estimating the response of the audience to the specific media sub-content by computing statistics of emotion changes from the segmented emotion trajectories.

17. An apparatus for determining emotional and attentional response of audience to dynamic digital media content, comprising:

a) means for detecting and tracking faces from input images of the audience captured by at least a means for capturing images, and localizing the faces and facial features, b) means for extracting emotion-sensitive features from the faces and determining facial muscle actions of the faces based on the emotion-sensitive features, c) means for finding changes in affective states, called emotion trajectories, of the audience based on the facial muscle actions, d) means for estimating eye gazes and three-dimensional poses of the faces, and estimating gaze directions of the faces based on the estimated eye gazes and the three-dimensional poses of the faces, e) means for estimating gaze targets of the audience based on the estimated gaze directions and the position of the faces, and f) means for determining the response of the audience to the dynamic digital media content, by analyzing the emotion trajectories in relation to time and screen positions of a specific digital media sub-content.

18. The apparatus according to claim 17, wherein the apparatus further comprises means for deriving and employing image filters to extract emotion-sensitive features, by first generating emotion-sensitive candidate filters and by choosing the emotion-sensitive feature filters from the emotion-sensitive candidate filters that yield high responses to a sufficient number of facial images.

19. The apparatus according to claim 18, wherein the apparatus further comprises means for generating emotion-sensitive candidate filters by constructing a set of filters, wherein each filter is designed to collect gradient response of a specific facial feature or a transient feature.

20. The apparatus according to claim 17, wherein the apparatus further comprises means for training a machine so that the machine accepts the emotion-sensitive features as an input and computes a vector output,
wherein each component of the vector is the likelihood of the emotion-sensitive features arising from a specific facial muscle action.

21. The apparatus according to claim 20, wherein the apparatus further comprises means for estimating the Action Units in the Facial Action Coding System as facial muscle actions.

22. The apparatus according to claim 17, wherein the apparatus further comprises means for determining affective states of the faces by using the mapping from the facial muscle actions to the six emotional categories.

23. The apparatus according to claim 17, wherein the apparatus further comprises means for determining affective states of the faces by using the coordinates of six emotional categories in the affect space.

24. The apparatus according to claim 17, wherein the apparatus further comprises means for training at least a machine for estimating the eye gazes from eye images.

25. The apparatus according to claim 17, wherein the apparatus further comprises means for training at least a machine for estimating the gaze directions.

26. The apparatus according to claim 25, wherein the apparatus further comprises means for training the machine for estimating the gaze directions from the eye gaze and the three-dimensional facial pose.

27. The apparatus according to claim 25, wherein the apparatus further comprises means for employing the machine for estimating the gaze directions from the eye images and the three-dimensional facial poses.

28. The apparatus according to claim 17, wherein the apparatus further comprises means for estimating the floor positions of people in the audience based on sizes of the faces and positions of the faces in the input images.

29. The apparatus according to claim 17, wherein the apparatus further comprises means for constructing gaze trajectories based on the estimated gaze targets.

30. The apparatus according to claim 17, wherein the apparatus further comprises means for segmenting the emotion trajectories in relation to the time and screen positions of the specific digital media sub-content.

31. The apparatus according to claim 30, wherein the apparatus further comprises means for accumulating the emotion trajectories from multiple people in the audience segmented for the specific digital media sub-content.

32. The apparatus according to claim 30, wherein the apparatus further comprises means for estimating the response of the audience to the specific media sub-content by computing statistics of emotion changes from the segmented emotion trajectories.

* * * * *